*US010366384B2*

United States Patent
Sasaki et al.

(10) Patent No.: US 10,366,384 B2
(45) Date of Patent: Jul. 30, 2019

(54) CARD PAYMENT TERMINAL DEVICE

(71) Applicant: PANASONIC INTELLECTUAL PROPERTY MANAGEMENT CO., LTD., Osaka (JP)

(72) Inventors: Makoto Sasaki, Kanagawa (JP); Kyohei Kida, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 387 days.

(21) Appl. No.: 15/129,062

(22) PCT Filed: Sep. 17, 2015

(86) PCT No.: PCT/JP2015/004753
§ 371 (c)(1),
(2) Date: Sep. 26, 2016

(87) PCT Pub. No.: WO2016/051709
PCT Pub. Date: Apr. 7, 2016

(65) Prior Publication Data
US 2017/0300893 A1      Oct. 19, 2017

(30) Foreign Application Priority Data
Sep. 30, 2014 (JP) .................. 2014-202198

(51) Int. Cl.
*G06F 3/14*      (2006.01)
*G06Q 20/34*      (2012.01)
(Continued)

(52) U.S. Cl.
CPC ........... *G06Q 20/34* (2013.01); *G06F 3/0486* (2013.01); *G06F 3/0488* (2013.01);
(Continued)

(58) Field of Classification Search
CPC .... G06Q 20/34; G06Q 20/204; G06Q 20/209; G07F 7/0873; G07G 1/0018; G07G 1/01;
(Continued)

(56) References Cited

U.S. PATENT DOCUMENTS 5,661,634 A * 8/1997 Obata .................. G06F 1/1626
 361/679.02
5,914,481 A * 6/1999 Danielson ........... B60R 16/0231
 235/462.15
(Continued)

FOREIGN PATENT DOCUMENTS

JP    2000-231670    8/2000
JP    2011-048486    3/2011
(Continued)

OTHER PUBLICATIONS

Search Report issued in International Patent Application No. PCT/JP2015/004753, dated Oct. 20, 2015.

*Primary Examiner* — Seung H Lee
(74) *Attorney, Agent, or Firm* — Greenblum & Bernstein, P.L.C.

(57) ABSTRACT

A payment terminal device attenuates or turns on a backlight illuminating a display of a touch panel displaying a screen relating to payment processing when information relating to the payment processing is printed in a print module. In addition, the payment terminal device turns off the attenuated or turned off backlight, after the printing of the information relating to the payment processing is finished by the print module. When the printer is operated, by pausing or suspending a part of a function or a process, a total amount of current flowing into a power supply stored inside a housing is reduced and power consumption is reduced.

13 Claims, 22 Drawing Sheets

(51) Int. Cl.
  *G07G 1/01* (2006.01)
  *G06Q 20/20* (2012.01)
  *G06F 3/0488* (2013.01)
  *G06F 3/0486* (2013.01)
  *G07G 1/00* (2006.01)
  *G07F 7/08* (2006.01)
  *G06F 3/041* (2006.01)

(52) U.S. Cl.
  CPC ......... *G06Q 20/204* (2013.01); *G06Q 20/209* (2013.01); *G07F 7/0873* (2013.01); *G07G 1/0018* (2013.01); *G07G 1/01* (2013.01); *G06F 3/0416* (2013.01); *G06F 3/04886* (2013.01); *G06F 3/14* (2013.01)

(58) Field of Classification Search
  CPC ........ G06F 3/0486; G06F 3/0488; G06F 3/14; G06F 3/04886; G06F 3/0416
  See application file for complete search history.

(56) References Cited

U.S. PATENT DOCUMENTS

| | | | |
|---|---|---|---|
| 2004/0117301 A1* | 6/2004 | Fujisawa | G06Q 20/04 705/39 |
| 2011/0055750 A1 | 3/2011 | Fukuda et al. | |
| 2011/0227854 A1 | 9/2011 | Koya | |
| 2015/0161601 A1 | 6/2015 | Matsumoto et al. | |
| 2016/0042178 A1* | 2/2016 | Ninomiya | G06F 21/629 726/23 |
| 2016/0063953 A1* | 3/2016 | Sasaki | G09G 3/3406 345/212 |

FOREIGN PATENT DOCUMENTS

| | | |
|---|---|---|
| JP | 2011-199652 | 10/2011 |
| JP | 2013-054580 | 3/2013 |

\* cited by examiner

*FIG. 18*

```
<!DOCTYPE HTML>
<HTML>
  <HEAD>
    <TITLE> IC CREDIT PAYMENT </TITLE>
    <SCRIPT LANGUAGE="JavaScript">
    function PaymentInfInput()
    {
        SCAN PROMPT
        BRAND SELECTION
        AMOUNT INPUT
        PAYMENT TYPE AND THE NUMBER OF
        PAYMENT INPUT
        PIN INPUT
        PAYMENT REQUEST TRANSMISSION      ← PRS
    }
    </SCRIPT>
  </HEAD>
  <BODY>
    <SCRIPT LANGUAGE="JavaScript">
     PaymentInfInput()
    </SCRIPT>
       ⋮                  ↖ PRA
  </BODY>
</HTML>
```

HD (head section), BD (body section)

FIG. 19A

```
IC CREDIT PAYMENT

READING CARD
```
— WD1

FIG. 19B

```
IC CREDIT PAYMENT

BRAND SELECTION

MESPOR VOJA ...

[ RETURN ]   [ NEXT ]
```
— WD2

FIG. 19C

```
IC CREDIT PAYMENT

AMOUNT INPUT  _____ YEN

[ RETURN ]   [ NEXT ]
```
— WD3

FIG. 19D

```
IC CREDIT PAYMENT

PAYMENT TYPE  ■ ONE-TIME
              □ _____ TIMES
              □ BONUS      — TIMES
              □ REVOLVING  — TIMES

[ RETURN ]   [ NEXT ]
```
— WD4

FIG. 19E

```
IC CREDIT PAYMENT

ENTER PASSWORD
    ****
```
— WD5

FIG. 19F

```
IC CREDIT PAYMENT

AMOUNT   OOOOO  YEN
ONE-TIME
A HOUSE CARD
      CARD NO  1234-5678-9012-3456

[ RETURN ]   [ SEND ]
```
— WD6

CARD PAYMENT TERMINAL DEVICE

TECHNICAL FIELD

The present disclosure relates to a card payment terminal device to be used for performing a procedure for payment processing in a transaction.

BACKGROUND ART

On a touch panel mounted on a card payment terminal device to be used for performing a procedure for payment processing in the transaction, various software keys (also referred to as "software keyboard") are operably displayed. Among these software keys, a sales registration key, a confirmation completion key, or the like that is an important factor in the transaction for an operator (for example, a staff of a participating store (for example, a store) which deals with the payment processing in the transaction using a purchaser's credit card) who mainly uses the card payment terminal device is included.

For example, the sales registration key is pressed when the credit with respect to the purchaser is accepted without any problem, and a purchase amount is recorded as a sales amount. For example, the confirmation completion key is pressed, when a confirmation of contents of various items (for example, the purchase amount, the number of payments, a card brand, a personal identification number (PIN) to be input by the purchaser, or the like) to be input before communicating with a payment center is started, in the transaction using the credit card, is finished.

PLT 1 and PLT 2 are known as related techniques relating to a commercial terminal for processing the contents of the transaction using an input operation with respect to a software key of a touch panel.

In a compact payment terminal shown in PTL 1, an information display area and an information input area are set in a display region of a touch panel type display and a numeric keypad image pattern is displayed on the information input area to allow an input operation with respect to the numeric keypad image pattern. In addition, the compact payment terminal is provided with a printer. The printer prints information such as a result of the payment processing on a roll sheet that is built-in beforehand, and a receipt on which print contents are printed is discharged from a paper discharge port.

In addition, in a touch panel-mounted sales management device shown in PTL 2, a time when a touch panel is pressed by an operator is measured, and when the pressing duration exceeds a predetermined pressing recognition time, it is assumed that there is normal pressing on the touch panel, and then processing in accordance with the pressing on the touch panel is performed. On the other hand, when the pressing duration is equal to or shorter than the predetermined pressing recognition time, controlling for disregarding the process content in accordance with the pressing on the touch panel is performed.

However, it is difficult to prevent a software key that is an important factor for an operator such as a sales registration key, a confirmation completion key, or the like from being wrongly operated, in some cases. If such software keys that are important factors in the transaction are easily wrongly operated, there is a problem in that during the safe performance of the transaction, it causes problems on the participating store side and the customer side. In the other words, since an operation that is an important factor in the transaction is executed with the software key, there is a possibility that the wrong operation easily induced.

In a case where the software key that is an important factor in the transaction is a physical key (for example, a button) not a software key, it is required to have a two-step behavior that the operator comes into contact with the physical key and then presses the physical key. Therefore, when performing the operation that is an important factor in the transaction, the operator is relatively easily able to be aware that the operator presses the physical button.

However, in the card payment terminal device on which the touch panel is mounted, by only a simple operation that an operator's finger comes into contact with the software key displayed on the screen, it is regarded that the operation is the same as the operation that the software key is pressed, in the same manner of the two-step operation with respect to the physical key. Therefore, there is a possibility that the operator easily causes a wrong operation with respect to the software key that is an important factor in the transaction (hereinafter, referred to as an "important key").

An object of the present disclosure is to suppress an induction of the wrong operation by making the operator easily and clearly aware of the execution of the input operation that is an important factor in the transaction.

CITATION LIST

Patent Literature

PTL 1: Japanese Patent Unexamined Publication No. 2011-48486
PTL 2: Japanese Patent Unexamined Publication No. 2000-231670

SUMMARY OF THE INVENTION

A card payment terminal device of the present disclosure includes a payment processor that performs payment processing; a printer that prints information relating to the payment processing; a display that displays a screen relating to the payment processing; an illuminator that illuminates the display; and a controller which is configured to attenuate or turn off the illuminator during printing of information relating to the payment processing by the printer.

BRIEF DESCRIPTION OF DRAWINGS

FIG. 18 is an explanatory diagram illustrating an example of HTML data defining an execution program of payment processing A included in a card payment start screen.

FIG. 19A is a diagram illustrating an example of each screen to be displayed on a touch panel of the payment terminal device for each processing during executing of the execution program of payment processing A.

FIG. 19B is a diagram illustrating an example of each screen to be displayed on the touch panel of the payment terminal device for each processing during executing of the execution program of payment processing A.

FIG. 19C is a diagram illustrating an example of each screen to be displayed on the touch panel of the payment terminal device for each processing during executing of the execution program of payment processing A.

FIG. 19D is a diagram illustrating an example of each screen to be displayed on the touch panel of the payment terminal device for each processing during executing of the execution program of payment processing A.

FIG. 19E is a diagram illustrating an example of each screen to be displayed on the touch panel of the payment terminal device for each processing during executing of the execution program of payment processing A.

FIG. 19F is a diagram illustrating an example of each screen to be displayed on the touch panel of the payment terminal device for each processing during executing of the execution program of payment processing A.

DESCRIPTION OF EMBODIMENT

Hereinafter, each exemplary embodiment of a card payment terminal device relating to the present disclosure will be described with reference to drawings. The card payment terminal device to be used for performing a procedure of payment processing in a transaction will be described as an example of the card payment terminal device according to the present disclosure.

First Exemplary Embodiment

Figure 1:
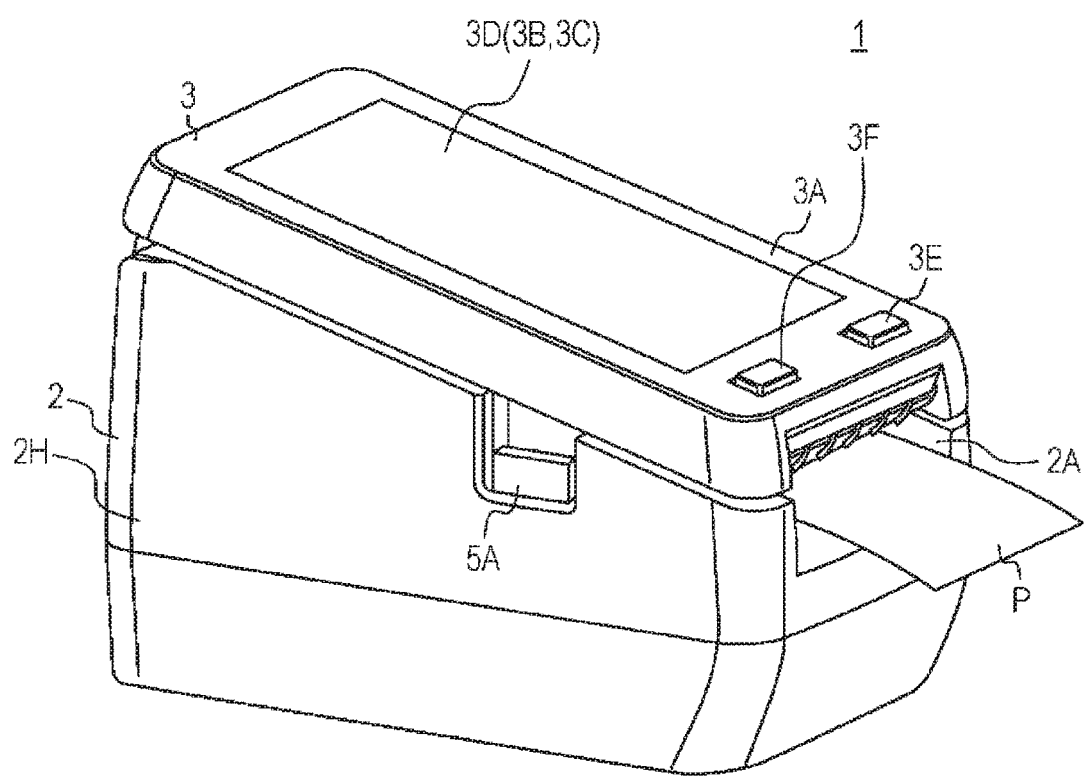
FIG. 1 is perspective view illustrating an appearance of a payment terminal device according to each of first to fourth exemplary embodiments.

FIG. 1 is perspective view illustrating an appearance of payment terminal device 1 according to each of first to fourth exemplary embodiments. Payment terminal device 1 shown in FIG. 1 can use, for example, a card payment terminal device for performing a payment of a magnetic reading type credit card.

Payment terminal device 1 shown in FIG. 1 has rectangular box-shaped main body 2 opened upward and lid 3 covering opening 2A of main body 2, in opening 2A to which printing paper P is discharged. In the flowing descriptions, lid 3 side will be described as upper and main body 2 side will be described as lower.

On top surface 3A of lid 3, touch panel 3D which is configured of display 3B (for example, a configuration using a liquid crystal display plate, refer to FIG. 2) and touch input detector 3C (for example, a configuration using a touch screen, refer to FIG. 2), power supply switch 3E for turning on or off a power supply of payment terminal device 1, and return key 3F for returning to a last state by canceling an input operation performed immediately before are provided.

In payment terminal device 1 shown in FIG. 1, return key 3F may be omitted. In this case, it may perform a process substantially identical to a pressing operation of return key 3F when the input operation with respect to return key 3F is performed with respect to touch panel 3D.

On display 3B which configures touch panel 3D, software operation keys as an software keyboard which is required for various operations, software numerical keys as an example of a software keyboard for performing an numbers input, numbers input by the software numeric key, information required for performing various operations or information indicating the operated result, and the like are displayed.

Figure 2:
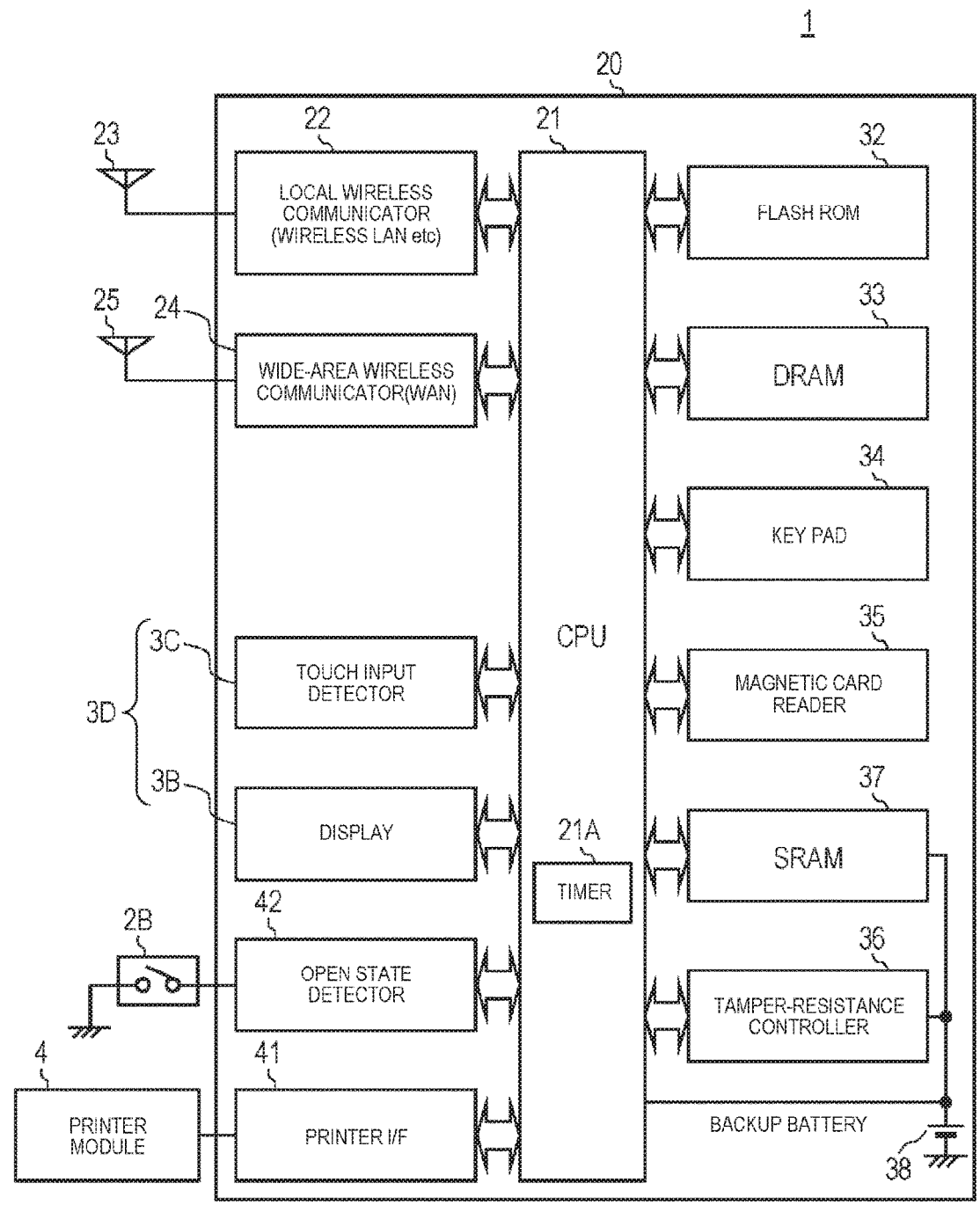
FIG. 2 is a block diagram illustrating an example of a hard configuration of the payment terminal device according to the first exemplary embodiment in detail.

FIG. 2 is a block diagram illustrating an example of a software configuration of payment terminal device 1 according to the first exemplary embodiment in detail. Payment terminal device 1 shown in FIG. 2 has information processor 20.

Information processor 20 of payment terminal device 1 shown in FIG. 2 has a configuration including CPU 21 for performing overall processes of each part of payment terminal device 1, local wireless communicator 22 to which local wireless communication antenna 23 is connected, wide-area wireless communicator 24 to which wide-area wireless communication antenna 25 is connected, touch panel 3D which is configured of display 3B and touch input detector 3C, flash ROM 32, DRAM 33, key pad 34, magnetic card reader 35, tamper-resistance controller 36, SRAM 37, backup battery 38, printer I/F 41 which is connected to printer module 4, and open state detector 42 which is connected to open state detecting switch 2B.

A central processing unit (CPU 21) has timer 21A for detecting a long-press operation of the operator for example and executes a control process for controlling overall operations of each part of payment terminal device 1, an input and output process of data between the other each of parts, and a storing an operating (calculating) process of data and data.

Local wireless communicator 22 is connected to local wireless communication antenna 23 and performs a wireless communication by a wireless communication local area network (LAN) for example, through a local wireless network. For example, the local wireless communication is not limited to the wireless LAN, and the local wireless communication may use Bluetooth (registered trademark) and other equipment.

Wide-area wireless communicator 24 is connected to wide-area wireless communication antenna 25 and performs a wide-area communication through a wide area network (WAN).

For example, the wide-area communication can use a communication by a mobile phone communication network such as a wideband code division multiple access (W-CDMA), an universal mobile telecommunications system (UMTS), a code division multiple access (CDMA) 2000, and a long term evolution (LTE).

Payment terminal device 1 according to the present exemplary embodiment mounts two wireless communicators as a communication function, that is, local wireless communicator 22 and wide-area wireless communicator 24. However, payment terminal device 1 may mount any one of the two wireless communicators. Payment terminal device may include a wired LAN such as IEEE802.3 and a wired communicate by a public telephone network or a dedicated telephone line.

For example, display 3B is configured by using a liquid crystal display (LCD) or an organic electroluminescence (EL) and displays various application screen, information items, and data items to be used in an application installed in payment terminal device 1 according to an instruction of CPU 21.

Touch input detector 3C as an example of an input operation detector detects an input operation of an operator (for example, a staff of a participating store of a credit card or a customer who have purchased the goods) with respect to touch panel 3D.

Flash read only memory (ROM) 32 stores various data items. For example, the stored data may be a data relating to a task and may be a program for controlling an operation of payment terminal device 1 (mainly, information processor 20). In addition, in the program, various programs relating to the operation of payment terminal device 1 such as an application for payment processing for performing the payment process between payment destination device and payment terminal device 1 as an example of a payment processor (for example, acquirer or payment processor) are stored.

Therefore, flash ROM 32 has a function as a recoding medium for recording the program.

An acquirer is a company that recruiting merchant contract handles a transaction of specific credit cards, and to control its credit sales. A payment processor is a company which acts as a payment by receiving a subcontracting from the acquirer.

When operation processing associated with an operation of payment terminal device 1 (mainly, information processor 20) dynamic random access memory (DRAM) 33 is a work memory to be used for temporarily storing process data generating in the middle of the process.

Key pad 34 is formed of power supply switch 3E and "return" key 3F shown in FIG. 1.

Magnetic card reader 35 is provided with a slit for sliding a magnetic card and is provided on a main body side surface opposite to main body side surface 2H on which lock release button 5A is provided in FIG. 1. Card information read from a magnetic stripe of the magnetic card by magnetic card reader 35 is to be input to CPU 21.

Printer module 4 as an example of a printer is connected to CPU 21 through printer interface (hereinafter, referred to as a "printer I/F") 41 for performing a bus transformation and a signal formation, and prints information or data instructed by CPU 21 on printing paper P under the control of CPU 21.

Open state detecting switch 2B is provided on main body 2. For example, main body 2 detects that lid 3 is opened by the operator and outputs the detection result to CPU 21 through open state detector 42. That is, a signal indicating that lid 3 is in an opened state or lid 3 is in a closed state is input to CPU 21.

In addition to this, a power supply for supplying power to each part of payment terminal device 1 including information processor 20 is provided.

CPU 21, tamper-resistance controller 36, are static random access memory (SRAM) 37 are connected to backup battery 38, and receives power from backup battery 38 during the power supply from the power supply is interrupted.

Tamper-resistance controller 36 maintains tamper resistance of payment terminal device 1. The tamper resistance means resistance against unauthorized analysis or alteration of a software or hardware inside the device, unauthorized takeover or alteration of information inside the device, and attacks that causes a process unavailable. That is, for example, the tamper resistance means a difficulty of an analysis of an internal structure which is provided in the software or the hardware or stored data. For example, by providing the temper resistance, information of a service receiver (for example, a customer) can be protected and the transaction can be safely performed. For example, the information of the service receiver is stored in SRAM 37. When the above mentioned unauthorized analysis, alteration, attack, information abduction, or signs from thereof is detected, tamper-resistance controller 36 deletes the information stored in SRAM 37 or not allow the information to access.

In information processor 20, a non-contact type IC card reader and writer for reading card information recorded in a non-contact type IC card and a contact type IC card reader for reading card information stored in a contact-type IC card may be provided. The card information ready by the non-contact type IC card reader and writer or the contact type IC card reader is input to CPU 21.

Figure 3:
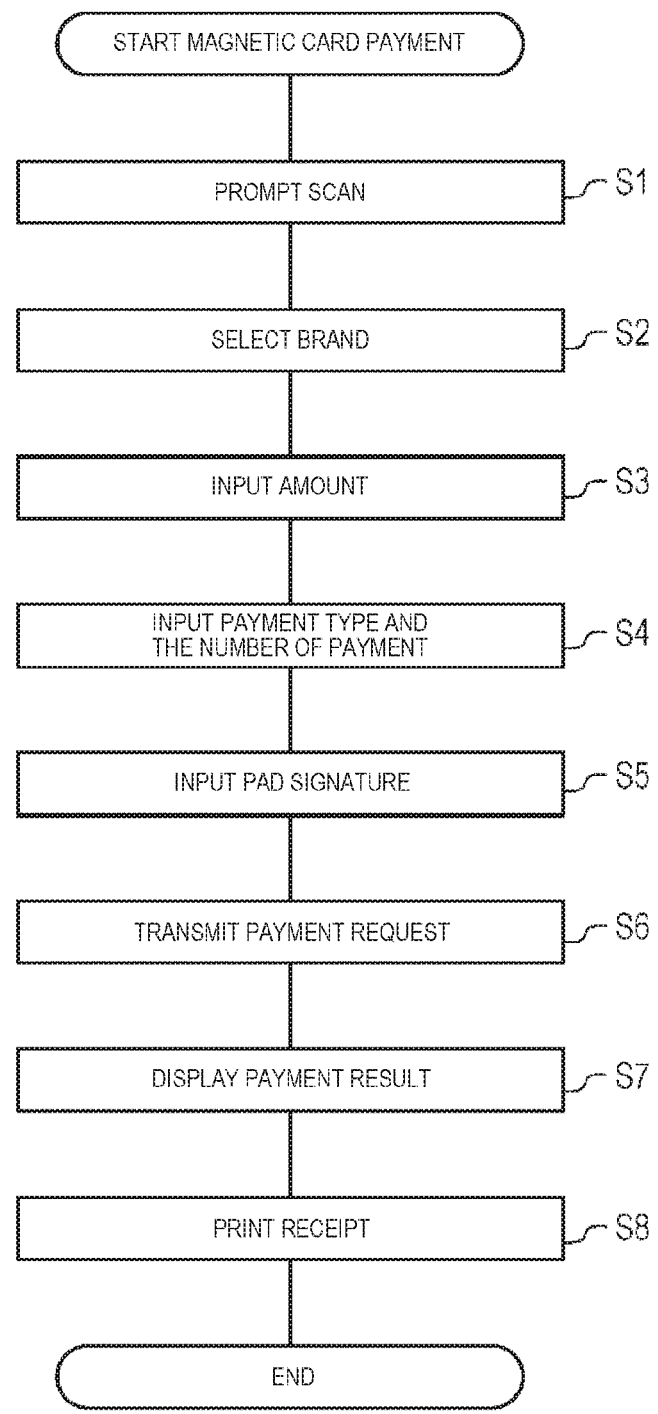
FIG. 3 is a flow chart illustrating a payment processing procedure of the payment terminal device according to the first exemplary embodiment.

Next, an operation of payment terminal device 1 according to the present exemplary embodiment will be described with reference to FIG. 3. FIG. 3 is a flow chart illustrating a payment processing procedure of payment terminal device 1 according to the first exemplary embodiment. In FIG. 3, for example, a case where the payment processing is performed using a customer's magnetic credit card will be described.

In FIG. 3, firstly, CPU 21 displays a prompt (screen) for prompting a magnetic card reading operation with respect to the operator to start an application for payment processing, with respect to display 3B of touch panel 3D (S1). When the staff of the participating store (for example, the store) performs reading operating of the magnetic credit card held in the customer, magnetic card reader 35 reads information recorded in the magnetic credit card. When receiving the information read by magnetic card reader 35, CPU 21 displays an input screen (for example, refer to FIG. 5) of a transaction content that is a target of the payment processing in the application for payment processing on display 3B of touch panel 3D.

Thereafter, the staff of the store performs an operation that inputs the information relating to the transaction content that is a target of the payment processing with respect to touch panel 3D, while requesting the customer confirmation. CPU 21 detects these input operations through touch input detector 3C.

For example, by the input operation of the operator (for example, the staff), a card brand of the magnetic credit card is selected and the information relating to the selected card brand is input to CPU 21 (S2). Subsequently, a payment amount is input by the input operation of the operator (for example, the staff), and the information relating to the input payment amount is input to CPU 21 (S3). Furthermore, a payment type (for example, a one-time payment, an installment payment, or the like) is selected, the number of payments is input, and the information relating to the selected payment type and input number of payments is input to CPU 21 (S4).

When the information such as the payment type is input, in this time, the customer input a signature of the customer itself with respect to a signature input area of a signature PAD displayed on display 3B of touch panel 3D. CPU 21 acquires the information relating to the input signature through touch input detector 3C (S5).

Thereafter, the customer performs an operation for finally confirming the input content relating to the transaction content that is a target of the payment processing with respect to touch panel 3D, and performs a predetermined input operation (to be described in detail) indicating that the input content is confirmed. CPU 21 performs a communication by local wireless communicator 22 or wide-area wireless communicator 24 according to the predetermined input operation indicating that the customer confirms the input content, and transmits a request of the payment processing including all of the input contents (for example, the card information, the payment amount, the payment type, and the number of payments) to the acquirer or the payment processor (S6).

A credit is given by the acquirer of the payment processor that is an example of a payment destination device. When the determination result for permitting of the transaction content is transmitted to payment terminal device 1, CPU 21 displays the confirmation result of the transaction content that is a target of the payment processing on display 3B of touch panel 3D (S7). Furthermore, CPU 21 prints the confirmation result of the transaction content that is the target of the payment processing as a receipt to printer module 4 (S8). Accordingly, the processes of payment terminal device 1 are terminated. A part performing a serious process relating to the payment processing shown in FIG. 3 associated with the program of the application for payment processing stored in flash ROM 32 by CPU 21 corresponds to a payment processor of the card payment terminal device according to the present disclosure.

Figure 4:
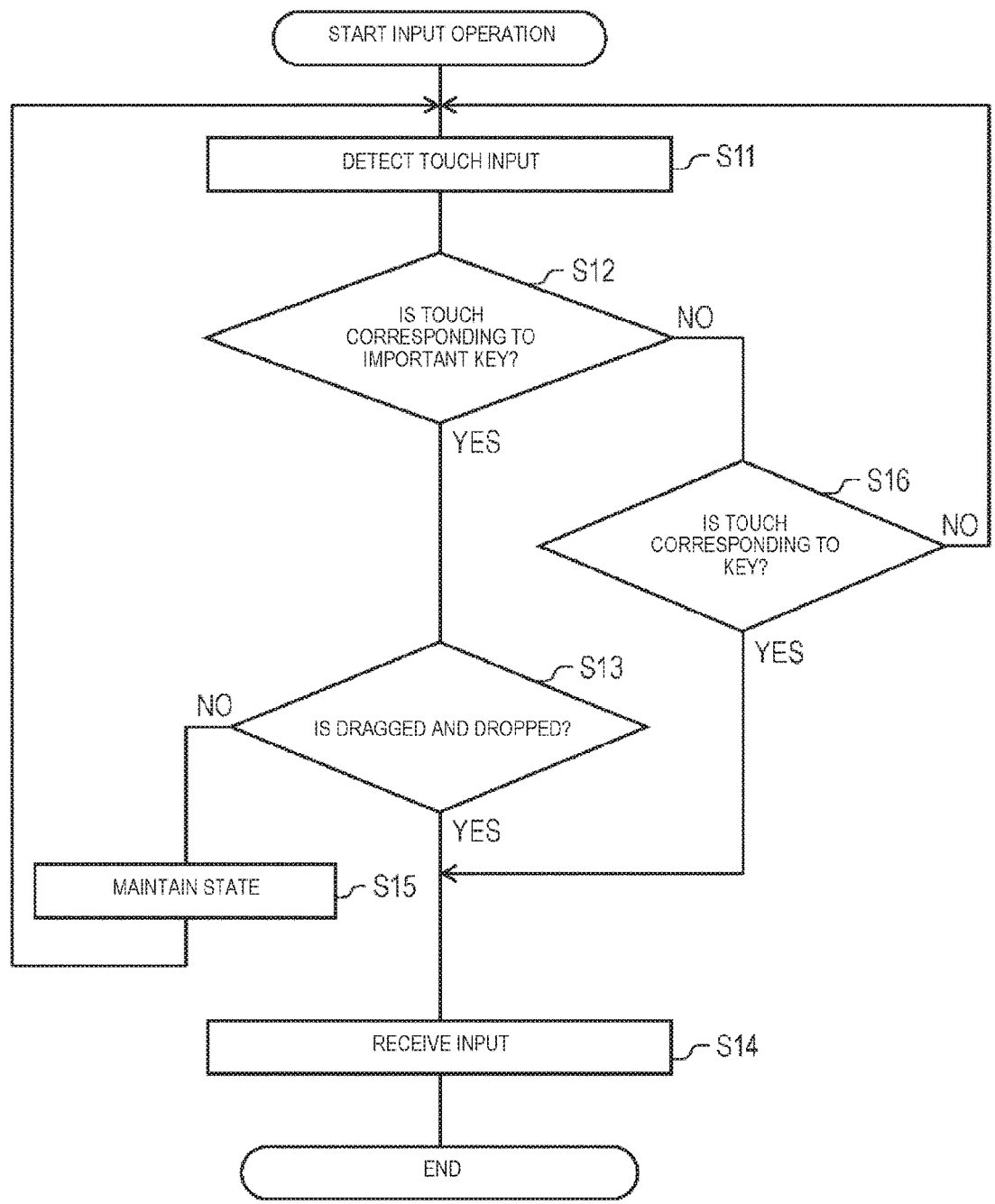
FIG. 4 is a flow chart illustrating a determination procedure for determining whether a predetermined input operation indicating that a customer confirmed input contents relating to transaction content in Step S6 shown in FIG. 3 is performed.

FIG. 4 is a flow chart illustrating a determination procedure for determining whether a predetermined input operation indicating that a customer confirmed an input contents relating to a transaction content in Step S6 shown in FIG. 3 is performed. For example, each process of the flow chart shown in FIG. 4 is performed during Step S6 shown in FIG. 3.

In FIG. 4, CPU 21 detects the input operation of the operator (touch input) in touch input detector 3C of touch panel 3D (S11). CPU 21 determines whether the touch input detected by touch input detector 3C is an input operation with respect to predetermined important key input receiving icon 61 (refer to FIG. 5) as an example of a specific target in the input screen of the transaction content that is a target of the payment processing of the application for payment processing (S12). Here, in flash ROM 32, a coordinate of important key input receiving icon 61 in the input screen of the transaction content that is a target of the payment processing of the application for payment processing is registered in advance. By combining the coordinate of CPU 21 of important key 52 and a touch input position (coordinate), CPU 21 determines the presence or absence of the touch input with respect to important key input receiving icon 61.

In a case where it is determined that there is the touch input with respect to important key input receiving icon 61 (S12, YES), CPU 21 identifies whether the predetermined input operation is performed with respect to important key input receiving icon 61 (S13). The predetermined input operation includes, for example, a selection operation of important key input receiving icon 61 shown in FIG. 5, a movement operation of important key input receiving icon 61 during selection operating, and a selecting releasing operation of important key input receiving icon 61 after movement operating. In detail, the predetermined input operation is a drag and drop operation, that is, a operation in which important key input receiving icon 61 is selected and dragged (moved) to any one of YES icon 63 and NO icon 65, and dropped (selection released) at the position.

As the predetermined input operation with respect to important key input receiving icon 61, for example, in a case where the drag and drop operation is performed in YES icon 63 through important key input receiving icon 61 (S13, YES), CPU 21 determines that the predetermined input operation (input confirmation) is performed with respect to important key input receiving icon 61 (input receiving, S14). Therefore, the processes of CPU 21 shown in FIG. 4 are terminated. As the predetermined input operation with respect to important key input receiving icon 61, for example, in a case where the drag and drop operation is performed in NO icon 65 through important key input receiving icon 61 (S13, YES), CPU 21 determines that the predetermined input operation (negative determination) is performed with respect to important key input receiving icon 61 (input receiving, S14). CPU 21 shown in FIG. 4 are terminated.

On the other hand, in a case where the predetermined input operation is not performed with respect to important key input receiving icon 61 or a case where the drag and drop operation is not performed on YES icon 63 through important key input receiving icon 61 (S13, NO), CPU 21 maintains the input touch operation state in Step S11 (S15), and the process of CPU 21 returns to Step S11.

In addition, in a case where it is not determined that the touch input detected by touch input detector 3C is a touch input with respect to important key input receiving icon 61 (S12, NO), CPU 21 determines that the input operation is performed in a case that the touch input detected by touch input detector 3C is a key (that is, a key other than the important key) (S16, YES) (input receiving, S14) and the process of CPU 21 returns to Step S11 in a case where the touch input is not the key (S16, NO). The process that CPU 21 determines the input operation shown in FIG. 4 associated with the program stored in flash ROM 32 corresponds to the input operation determination of the card payment terminal device according to the present disclosure.

Figure 5:
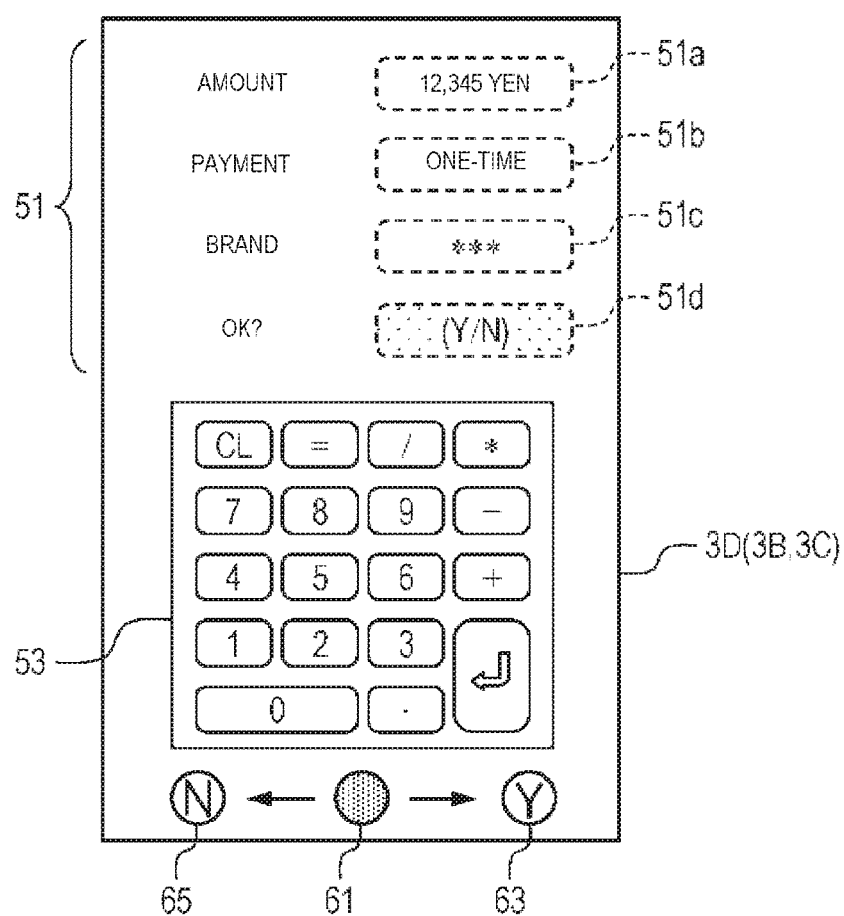
FIG. 5 is a diagram illustrating a screen displayed on a touch panel which is mounted on the payment terminal device.

FIG. 5 is a diagram illustrating a screen displayed on touch panel 3D which is mounted on the payment terminal device 1. On display 3B of touch panel 3D, the input screen of the transaction content that is a target of the payment processing in the application for payment processing is displayed and various information items 51 relating to the payment processing in the input screen. As various information items 51 relating to the payment processing, for example, the payment amount, a payment type, the card brand of the magnetic credit card, and a confirmation necessary item of the transaction content are displayed.

Specifically, information items of "Amount 12,345 YEN", "Payment One-time", "Brand *" (* indicates a brand name of the credit card), and "OK? (Y/N)" are displayed. Among the input screen of the transaction content shown in FIG. 5, touch input detector 3C is capable of detecting a touch input of the operator with respect to input areas 51a, 51b, 51c, and 51d corresponding to display portion these information items. Among input areas 51a, 51b, 51c, and 51d, for example, input area 51d is displayed for confirming the input content of the transaction content and corresponds to the important key (specific target) that is an important fact in the input screen of the transaction content.

In addition, numeric keypad 53 as an example of the software keyboard is displayed below information items 51 relating to the payment processing. Furthermore, important key input receiving icon 61, YES icon 63, and NO icon 65, which are provided so as to cause CPU 21 to determine that predetermined input operation is performed with respect to the important key, are displayed on the below the numeric keypad 53. In the present exemplary embodiment, the important key is not limited to the confirmation necessary item (that is, "Y/N") of the input content of the transaction content displayed corresponding to input area 51d shown in FIG. 5. The important key may be the above mentioned sales registration key or confirmation completion.

The contents displayed on input areas 51a, 51b, 51c, and 51d displayed on display 3B of touch panel 3D can be changed through the touch input with respect to any of the corresponding input areas. For example, the change of the payment amount is performed through the touch input of numeric keypad 53 after tapping input area 51a indicating the amount. In addition, input area 51a is the important key, in a case of confirming the sales amount, the operator performs the drag and drop operation important key input receiving icon 61 to the position of YES icon 63 after tapping and selecting input area 51a. Therefore, the sales amount (payment amount) is confirmed.

In addition, input area 51d "OK? (Y/N)" for finally confirming various information items 51 relating to the payment processing is described as the important key in the present exemplary embodiment. In a state where "OK?(Y/N)" is displayed, or after the state where the important key is tapped and selected (refer to FIG. 5), the operator performs the drag and drop operation of important key input receiving icon 61 to the position of YES icon 63. Therefore, the input confirmation of the transaction content is performed by the operator. On the other hand, when the operator performs the drag and drop operation of important key input receiving icon 61 to the position of NO icon 65, since the input confirmation of the transaction content is rejected, the change of the input item is performed again.

As described above, when any one screen of various screens relating to the payment processing to be performed between the payment destination device and payment terminal device 1 is displayed on touch panel 3D, payment terminal device 1 of the present exemplary embodiment detects the input operation with respect to a specific subject in the screen (for example, important key input receiving icon 61) and determines whether the input operation with respect to important key input receiving icon 61 is the predetermined input operation. In a case where the input operation with respect to important key input receiving icon 61 is the predetermined input operation, the process (for example, the payment processing request between the payment destination device and payment terminal device 1 after input confirming of the transaction content) corresponding to the predetermined input operation is executed.

Therefore, in a case where, for example, the input operation with respect to important key input receiving icon 61 which is displayed on the screen is the predetermined input operation as the operation that is an important factor in the transaction, in the screen displayed on touch panel 3D, since payment terminal device 1 executes the input operation that is an important factor in the transaction, by making the operator easily and clearly aware of the execution (that is, an execution of the input operation with respect to important key input receiving icon 61 of the screen displayed on touch panel 3D) of the input operation that is an important factor in the transaction. Therefore, an induction of the wrong operation of the software key (important key) that is an important factor in the transaction can be suppressed.

Since payment terminal device 1 displays predetermined important key input receiving icon 61 of a screen relating to the payment processing on touch panel 3D, when the input operation with respect to important key 52 is performed in the screen displayed on touch panel 3D, the payment terminal device 1 can be clearly aware of that the predetermined input operation with respect to important key input receiving icon 61 is required to the operator always.

In addition, in a case where the drag and drop operation is performed with respect to important key input receiving icon 61 in the screen displayed on touch panel 3D, since payment terminal device 1 executes the payment processing with respect to the important key, when it is considered that the drag and drop operation is an operation that is frequently used in a general purpose personal computer (PC) or the like, the wrong operation of the operator can be simply suppressed.

In the above mentioned first exemplary embodiment, in order to be aware of the operator that an input operation with respect to the important key, the drag and drop operation is operated on important key input receiving icon 61, the predetermined input operation with respect to important key input receiving icon 61 is not limited to the drag and drop operation.

For example, in the screen displayed on touch panel 3D, in a case where the selection operation is performed one time or more (for example, double-tap operation) after important key input receiving icon 61 is long-pressed over the predetermined time, payment terminal device 1 executes the payment processing with respect to the important key as same manner of a case where the drag and drop operation is performed with respect to important key input receiving icon 61. Therefore, the operation of payment terminal device 1 is different from the drag and drop operation and important key input receiving icon 61 may not move on the screen. Furthermore, since an operation range on the screen of an instruction medium (for example, an operator's finger or a stylus pen) to touch panel 3D is small, the operator can more easily perform the predetermined input operation. The present disclosure can be similarly applied also to a case when long pressing after performing a selection operation one time or more.

(Background to Details of a Second Embodiment)

Before being given to a second embodiment, explanations are first given to a background to details according to the second embodiment of payment terminal device 1.

In a case where the operator does not perform any input operation for the predetermined time (for example, for one minute), for example, in order to achieve screen burning prevention or power saving, the card payment terminal device shifts to a sleep mode (that is, a mode in which the power supply of the display of the touch panel is temporarily turned off) in some cases.

However, since too much time is needed in the payment processing, in a case of shifting to the sleep mode, the payment process is interrupted in the course. As a case where too much time is needed in the payment processing, for example, a network environment between the payment terminal device and the payment center is not a good condition, a case where the time is required to a communication process is included. In addition, a lot of payment terminal devices is connected to the payment center, the payment terminal device transmits a request of a requirement (for example, a credit inquiry) of the payment processing, a responding of the payment processing from the payment destination device is not obtained in some cases. Furthermore, in a case where the payment terminal device is configured of a thin-client, a data transfer amount which flows a network between the payment destination device and payment terminal device is greatly increased as compared to a conventional rich-client in some cases.

Accordingly, when the payment processing is interrupted once, in order to restart the payment processing, since it takes a lot of trouble with the process and it is require to time for returning process, forcing operate for returning from the sleep mode, the customer needs to wait in some cases.

Second Exemplary Embodiment

In the second exemplary embodiment, in a case where a screen relating to at least payment processing is displayed, even in a case where a state without the input operation from the operator is continued over the predetermined time, the shifting to the sleep mode is avoided, and an example of the card payment terminal device which can rapidly complete the payment processing of the transaction content will be described.

Since an appearance of payment terminal device 1 according to the second exemplary embodiment is identical to the appearance (refer to FIG. 1) of the payment terminal device according to the above mentioned first exemplary embodiment, the same reference numerals are used. Therefore, the description thereof will not be described below. In addition, a hardware configuration of payment terminal device 1 according to the second exemplary embodiment is also identical to the payment terminal device (refer to FIG. 2) according to the above-described first exemplary embodiment, the same reference numerals are used. Therefore, the description thereof will not be described below. Hereinafter, an operation different from the above-described first exemplary embodiment, that is, an operation relating to a control of the presence or absence of shifting to the sleep mode will be described.

Similarly to the first exemplary embodiment, when any screen is displayed on touch panel 3D, payment terminal device 1 of the present exemplary embodiment detects the input operation of the operator with respect to the screen. However, in a case where the input operation is not detected over a certain time in the screen, payment terminal device 1 according to the first exemplary embodiment control the touch panel 3D to shift to the sleep mode. In the sleep mode, display 3B of touch panel 3D turns off the screen and touch input detector 3C not detect the input operation. In the sleep mode, touch input detector 3C may detect the input operation.

Figure 6:
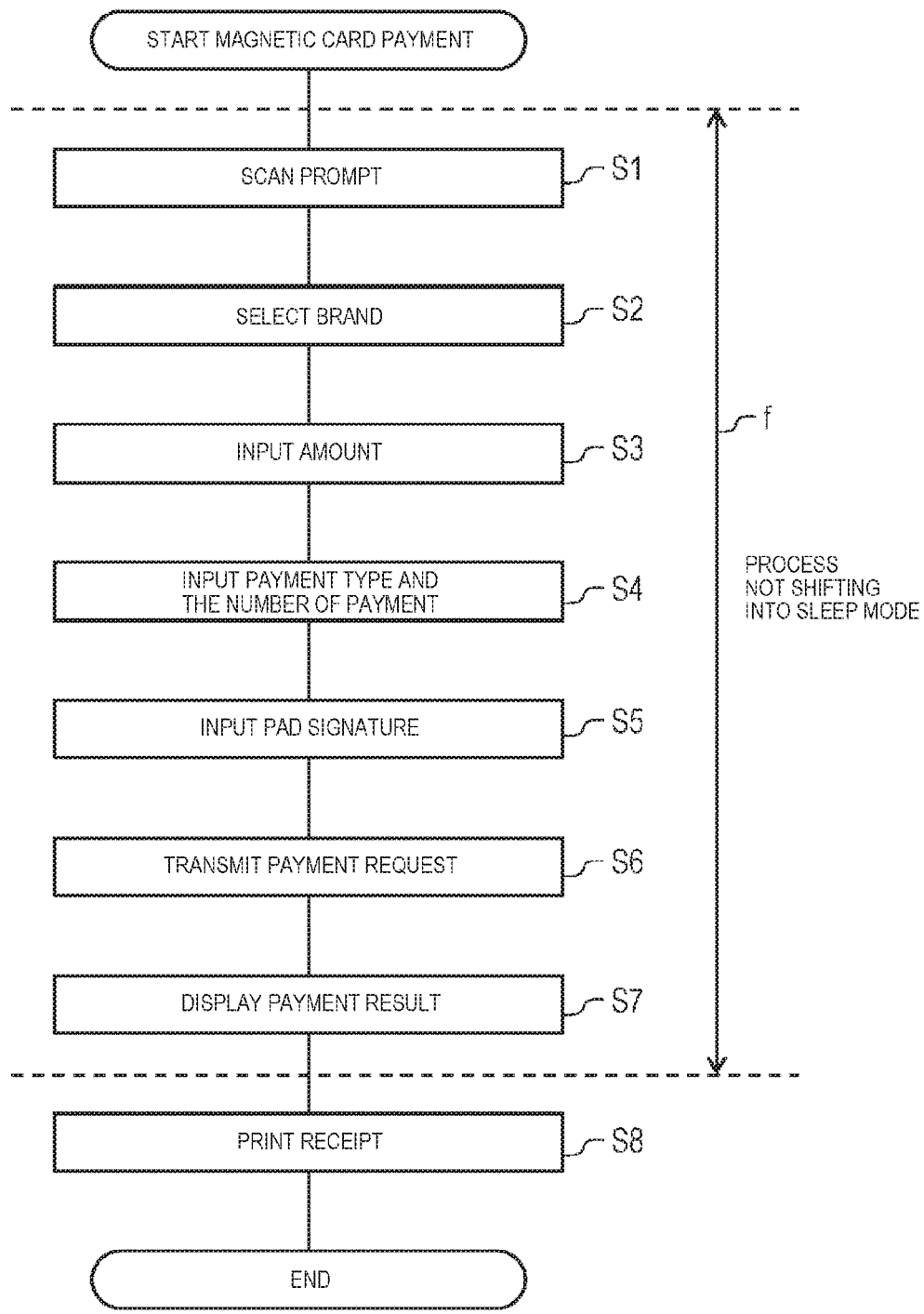
FIG. 6 is a flow chart illustrating a payment processing procedure of a payment terminal device according to a second exemplary embodiment.

FIG. 6 is a flow chart illustrating a payment processing procedure of payment terminal device 1 according to the second exemplary embodiment. Since each process of the flow chart shown in FIG. 6 is identical to each process of the flow chart shown in FIG. 3 in the above-described first exemplary embodiment, the detailed description of each process will not be described.

However, since each process shown in FIG. 6 is a process relating to the payment processing, payment terminal device 1 according to the present exemplary embodiment controls the display 3B of touch panel 3D to not shift to the sleep mode even a case were the input operation with respect to the screen of display 3B of touch panel 3D is not detected. More specifically, in a time period shown by an arrow f of FIG. 6 (that is, a time period from a display process of the scan prompt for prompting reading of the magnetic credit card of Step S1 to a display process of the confirmation result of the transaction content that is a target of the payment processing of Step S7), payment terminal device 1 controls display 3B of touch panel 3D to not shift to the sleep mode. In the process of a receipt print of Step S8, payment terminal device 1 may control display 3B of touch panel 3D to shift to the sleep mode.

In particular, in each process of Steps S6 and S7 during a communication between the payment destination device and payment terminal device 1, payment terminal device 1 omits the shifting of display 3B of touch panel 3D to the sleep mode. In addition, even in each process of Steps S1 to S5, a case where a time is needed to the input operation of the operator may be provided. For example, a case where the staff needs to confirm the goods leaving the place or a case where the customer cannot be at the place on urgent business is included.

In this manner, when considering a case where the time may be needed to operate of the operator, even in each process of Steps S1 to S5, payment terminal device 1 may control display 3B of touch panel 3D to shift to the sleep mode.

Figure 7:
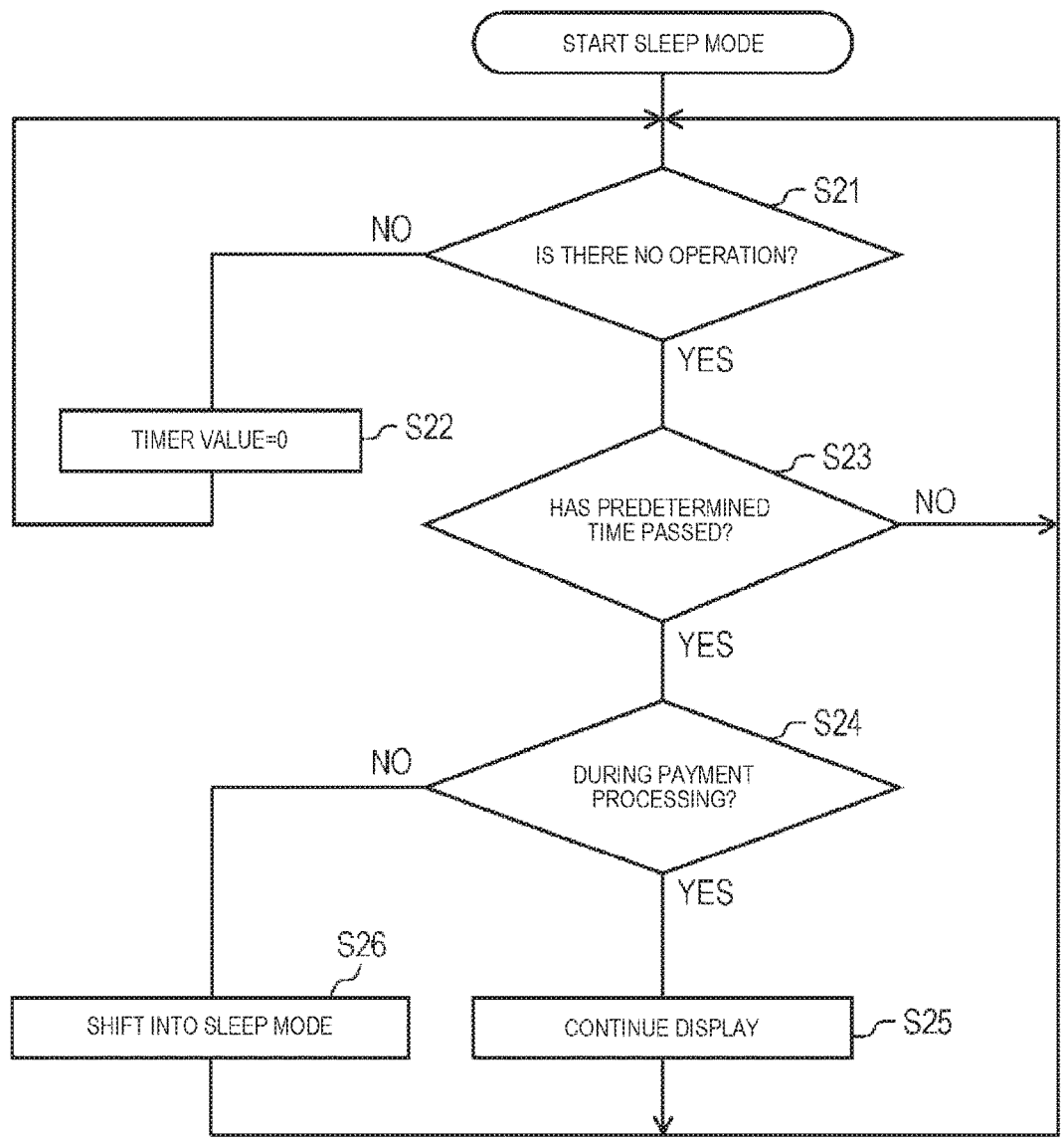
FIG. 7 is a flow chart illustrating a sleep mode shifting process procedure of the payment terminal device according to the second exemplary embodiment.

FIG. 7 is a flow chart illustrating a sleep mode shifting process procedure of payment terminal device 1 according to the second exemplary embodiment.

In FIG. 7, CPU 21 determines whether the input operation with respect to touch panel 3D of the operator is not performed that is in a non-operation state according to the signal from touch input detector 3C indicating the presence or absence of the detection of the input operation (S21). For example, in a case where there is no operation and any input operation is not detected (S21, NO), CPU 21 clears a count value (timer value) of timer 21A to 0 (S22). Thereafter, the process of CPU 21 returns to Step S21.

On the other hand, in a case where it is determined that there is no operation (S21, YES), CPU 21 determines whether the timer 21A is elapsed over the predetermined time (for example, for 1 minute) (S23).

In a case where the predetermined time is not elapsed (S23, NO), the process of CPU 21 returns to Step S21.

On the other hand, in a case where the predetermined is elapsed (S23, YES), CPU 21 determines whether the payment processing is currently performed (S24). For example, a case where the payment processing is currently performed indicates a case where the above-described application for payment processing is activated, any one of processes of Steps S1 to S7 shown in FIG. 6 is in the middle of executing.

In a case where the payment processing is currently performed (S24, YES), CPU 21 omits the shifting display 3B of touch panel 3D to the sleep mode, the display (for example, refer to FIG. 8A) of the screen relating to the payment processing displayed on display 3B is continued (S25). Thereafter, the process of CPU 21 returns to Step S21.

On the other hand, in a case where the payment processing is not currently performed (S24, NO), CPU 21 controls display 3B of touch panel 3D to sleep mode, turns off display 3B (refer to FIG. 8B), and the screen is darkened (S26). Thereafter, the process of CPU 21 returns to Step S21. The process that CPU 21 controls the shifting to the sleep mode shown in FIG. 7 associated with the program stored in flash ROM 32 corresponds to the sleep mode controller of the card payment terminal device according to the present disclosure.

Figure 8A:
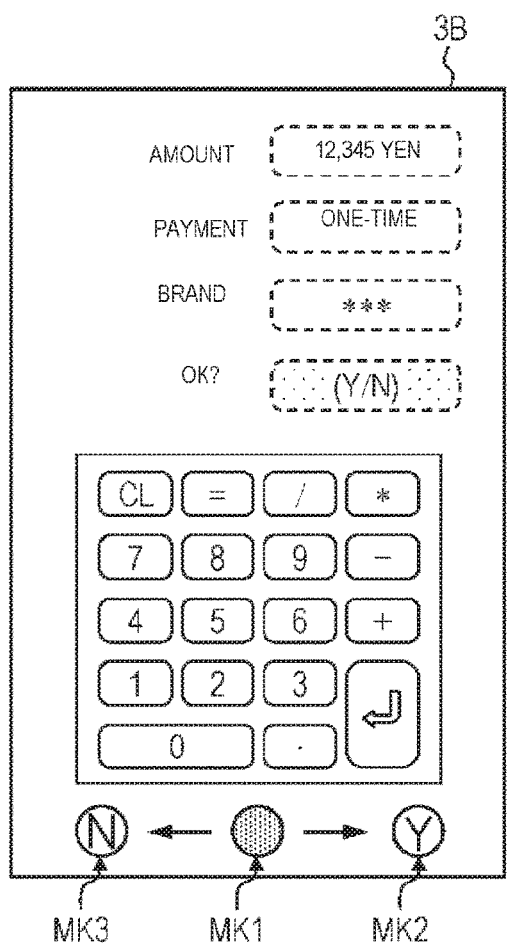
FIG. 8A is a diagram illustrating a screen relating to the payment processing.
Figure 8B:
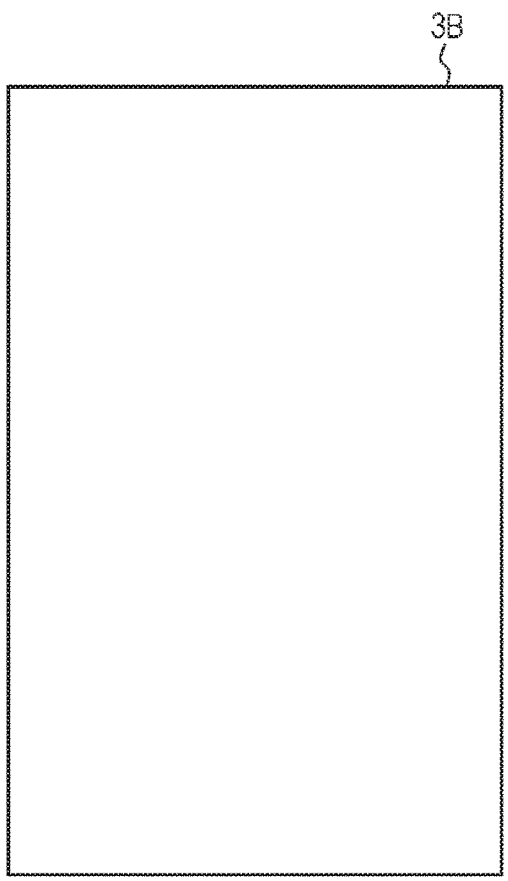
FIG. 8B is a diagram illustrating a screen of a display in a case of shifting to a sleep mode.

FIG. 8A is a diagram illustrating a screen relating to the payment processing. FIG. 8B is a diagram illustrating a screen of display 3B in a case of shifting to a sleep mode. Input receiving icon MK1, YES icon MK2, are NO icon MK3 in FIG. 8A correspond to important key input receiving icon 61, YES icon 63, and NO icon 65 shown in FIG. 5 according to the first exemplary embodiment respectively. In FIG. 8B, by making the screen to a white background, the white background indicates lighting of display 3B.

According to the above, when any one of the screens is displayed on touch panel 3D, payment terminal device 1 according to the present exemplary embodiment detects the input operation with respect to the screen. However, in a case where the input operation is not detected over the certain time in the screen, payment terminal device 1 controls the touch panel 3D to shift to the sleep mode. In addition, during the screen relating to the payment processing to be performed between at least payment destination device and payment terminal device 1 is displayed on display 3B of touch panel 3D, even when the input operation with respect to the screen is not detected over the certain time, the shifting of touch panel 3D to the sleep mode is omitted, a display of the content displayed on display 3B of touch panel 3D is continued.

Therefore, in payment terminal device 1, during the screen relating to the payment processing to be performed between at least payment destination devices is displayed on display 3B of touch panel 3D, even in a case where a state there is no input operation from the operator is continued over the predetermined time, since the shifting to the sleep mode of touch panel 3D can be avoided, the payment processing is not temporarily interrupted. Therefore, since it is not need to perform the input operation for returning from the sleep mode, the payment processing of the transaction content can be rapidly terminated.

In addition, during the communication for the payment processing of the transaction content between the payment destination device and payment terminal device 1 (for example, a credit inquiry or a sales registration) is performed, since payment terminal device 1 control to display 3B of touch panel 3D not to shift to the sleep mode and continues the displaying of the content displayed on display 3B of touch panel 3D, it is possible to prevent the communication between the payment destination device and payment terminal device 1 from being interrupted and it is possible to reliably terminate the payment processing between the payment destination device and payment terminal device 1.

(Background to Details of a Third Embodiment)

Before being given to a third embodiment, explanations are first given to a background to details according to the third embodiment of payment terminal device 1.

In a case where next input operation is not detected even when the predetermined time (for example, 1 minute) has elapsed from when the input operation of the operator is detected, in order to achieve screen burning prevention or power saving, the card payment terminal device controls the screen to shift to a sleep mode in some cases. In addition, when any input operation the operator is detected during the sleep mode, the card payment terminal device releases the sleep mode of the screen, and displays the screen displayed immediately before shifting to the sleep mode in some cases.

However, in a case where the card payment terminal device controls the screen to shift to the sleep mode after any input operation against the intention the operator is detected (for example, in a case where the operator unintentionally touches the touch panel or performs an operation to be recognized as an input by mistake (so-called a wrong operation) and then since non-operation state of the operator is continued over the predetermined time, the screen is shifted to the sleep mode), the following matters may be provided. That is, by performing any input operation with respect to the card payment terminal device before the screen is shifted to the sleep mode by the operator, in a case where the sleep mode is released, the card payment terminal device displays that is not intended for the operator in some cases.

As a result, the operator is confused by the display of the screen which is not intended by itself, and before the start of input operation that has been planned at first, it may be spent a little time and effort.

Third Exemplary Embodiment

In the third exemplary embodiment, a display of the screen which is not intended by the operator immediately after release of the sleep mode of the card payment terminal device is suppressed, and an example of the card payment terminal device for improving the convenience of the input operation with respect to the operator will be described.

Since an appearance of payment terminal device 1 according to the third exemplary embodiment is identical to the appearance (refer to FIG. 1) of the payment terminal device according to the above mentioned first exemplary embodiment, the same reference numerals are used. Therefore, the description thereof will not be described below.

Figure 9:
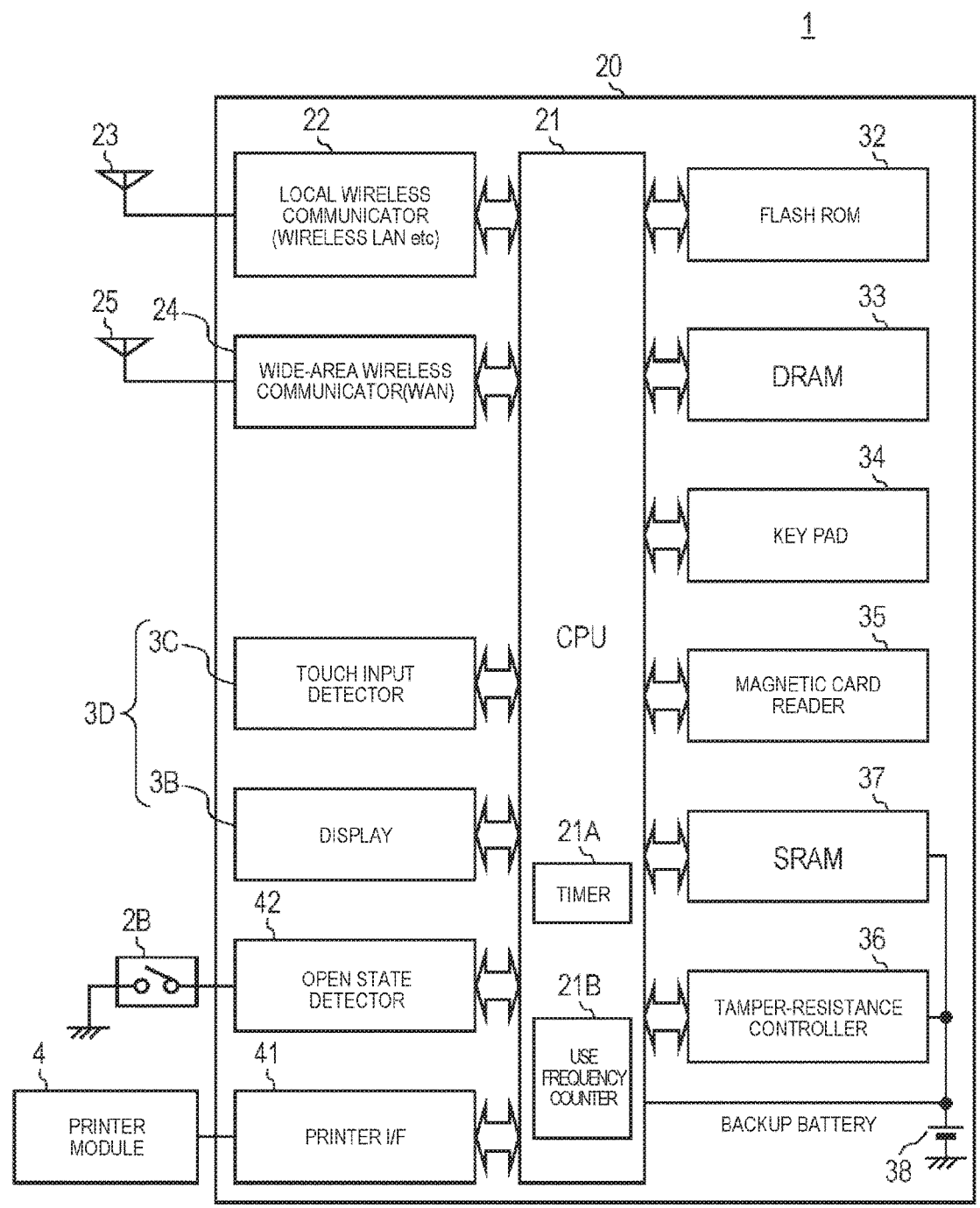
FIG. 9 is a block diagram illustrating an example of a hardware configuration of a payment terminal device according to a third exemplary embodiment in detail.

FIG. 9 is a block diagram illustrating an example of a software configuration of payment terminal device 1 according to the third exemplary embodiment in detail. In addition, in the hardware configuration of payment terminal device 1, the same components as the corresponding components of payment terminal device 1 of the first exemplary embodiment are denoted by the same reference numerals and will not be described below.

In addition to timer 21A described in the first exemplary embodiment, CPU 21 further has use frequency counter 21B for counting the number of displays (display frequency and use frequency) of the screen (for example, the menu screen) displayed on display 3B.

With respect to a plurality of menu screens in which predetermined hierarchical relationships (hierarchical structure, for example, refer to FIG. 10) are allocated, use frequency counter 21B counts the number of displays in display 3B of touch panel 3D of each menu screen. For example, CPU 21 reads the menu screen corresponding to the content of various applications registered in flash ROM 32 in advance and displays the menu screen on display 3B of touch panel 3D, use frequency counter 21B increments a value of the number of displays of the corresponding menu screen by "1". When use frequency counter 21B increments the number of displays, it is preferable that CPU 21 stores the number of displays to use frequency counter 21B with date and time information to be measured by timer 21A.

As will be described below, the menu screen with high frequency of use (a large number of displays) is selected as a return destination when the menu screen which is allocated in the hierarchy lower than the hierarchy corresponding to the menu screen is released from the sleep mode (that is, the screen displayed on display 3B of touch panel 3D).

Figure 10:
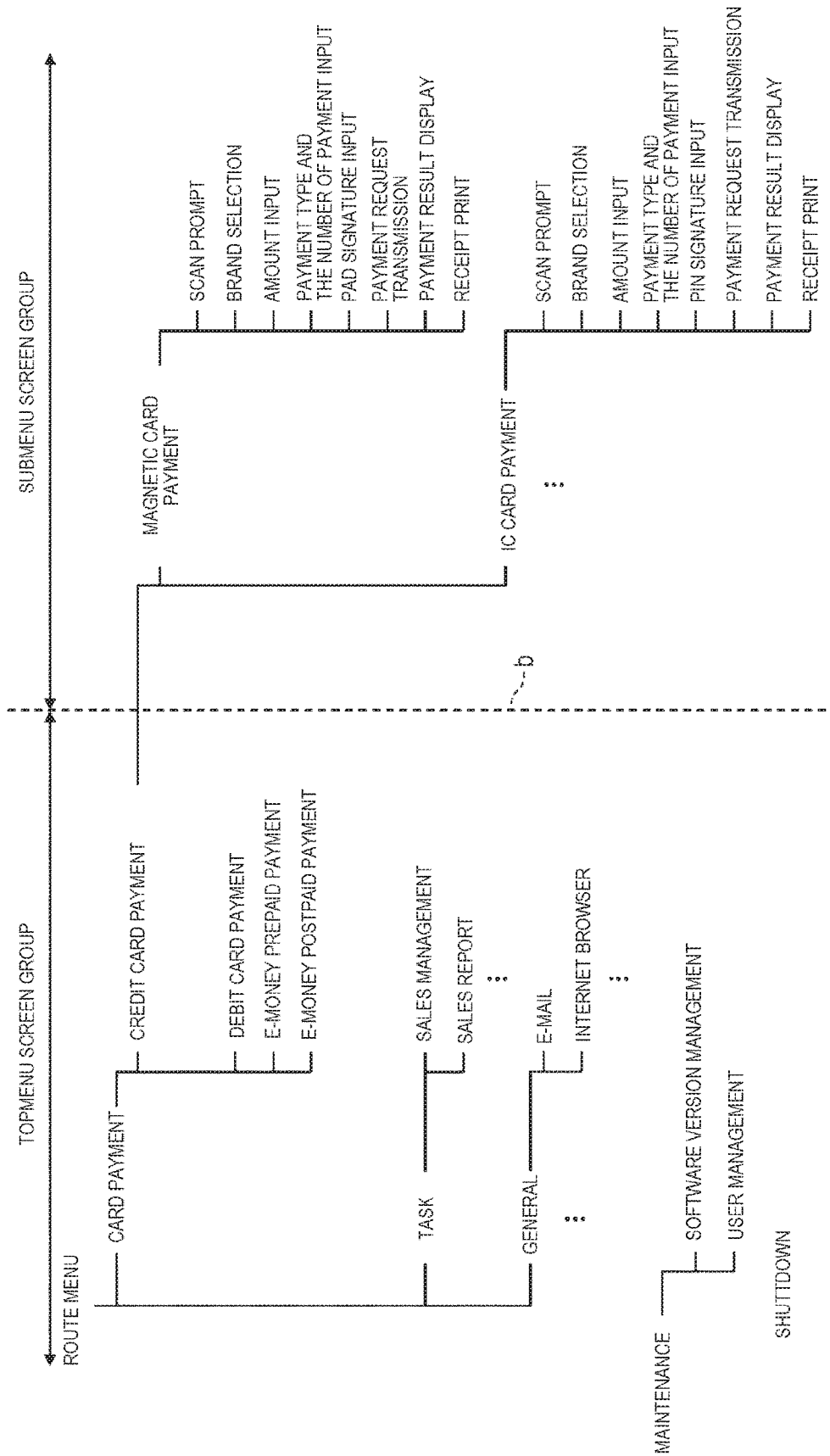
FIG. 10 is a diagram illustrating a hierarchical structure of a plurality of menu screens displayed on a display.

FIG. 10 is a diagram illustrating a hierarchical structure of a plurality of menu screens displayed on display 3B. Data indicating a plurality of the menu screens and the hierarchical structures thereof is stored in flash ROM 32 in advance. In the hierarchical structure shown in FIG. 10, for example, menu screens belong to the top menu screen group (hereinafter, top menu screen) are allocated at a left side than a boundary line of a partition line b, and the menu screens belong to the submenu screen group (hereinafter, submenu screen) are allocated at a right side than the boundary line of the partition line b. In addition, in FIG. 10, for example, the submenu screen is expanded from the top menu screen.

In FIG. 10, for example, as the top menu, each menu screen of a route menu, a maintenance, and a shutdown is allocated. As the submenu screen than the menu screen of the route menu, the menu screens of a card payment, a task, and a general are allocated (expanded).

Furthermore, as the submenu screen than the menu screen of the card payment, each menu screen of a credit card payment, a debit card payment, an e-money prepaid payment, and an e-money postpaid payment is allocated.

In addition, as the submenu screen than the menu screen of the credit card payment, each menu screen of a magnetic card payment and an IC card payment is allocated.

In addition, as the submenu screen than the menu screen of the magnetic card payment, each menu screen of a scan prompt, a brand selection, an amount input, a payment type and the number of payments input, a PAD signature input, a payment request transmission, a payment result display, and a receipt print is allocated. Similarly, as the submenu screen than the menu screen of the IC card payment, each menu screen of a scan prompt, a brand selection, an amount input, a payment type and the number of payments input, a PIN input, a payment request transmission, a payment result display, and a receipt print is allocated.

On the other hand, as the submenu screen than the task menu screen, each menu screen of a sales management and a sales report is allocated. Similarly, as the submenu screen than the general menu screen, each menu screen of an e-mail and an Internet browser is allocated. In addition, on the other hand, as the submenu screen than the maintenance menu screen, each menu screen of a software version management and a user management is allocated.

In the present exemplary embodiment, in the menu screen left side than the partition line b shown in FIG. 10 (that is, the top menu screen), in a case where the screen is return from the sleep mode (that is, the sleep mode is released), the return destination becomes the predetermined screen (that is, the top menu screen (refer to below)).

On the other hand, in the menu screen right side than the partition line b shown in FIG. 10 (that is, the submenu the screen), in a case where the screen is returned from the sleep mode, the return destination becomes the menu screen displayed on display 3B of touch panel 3D immediately before the shifting from the sleep mode.

Figure 11:
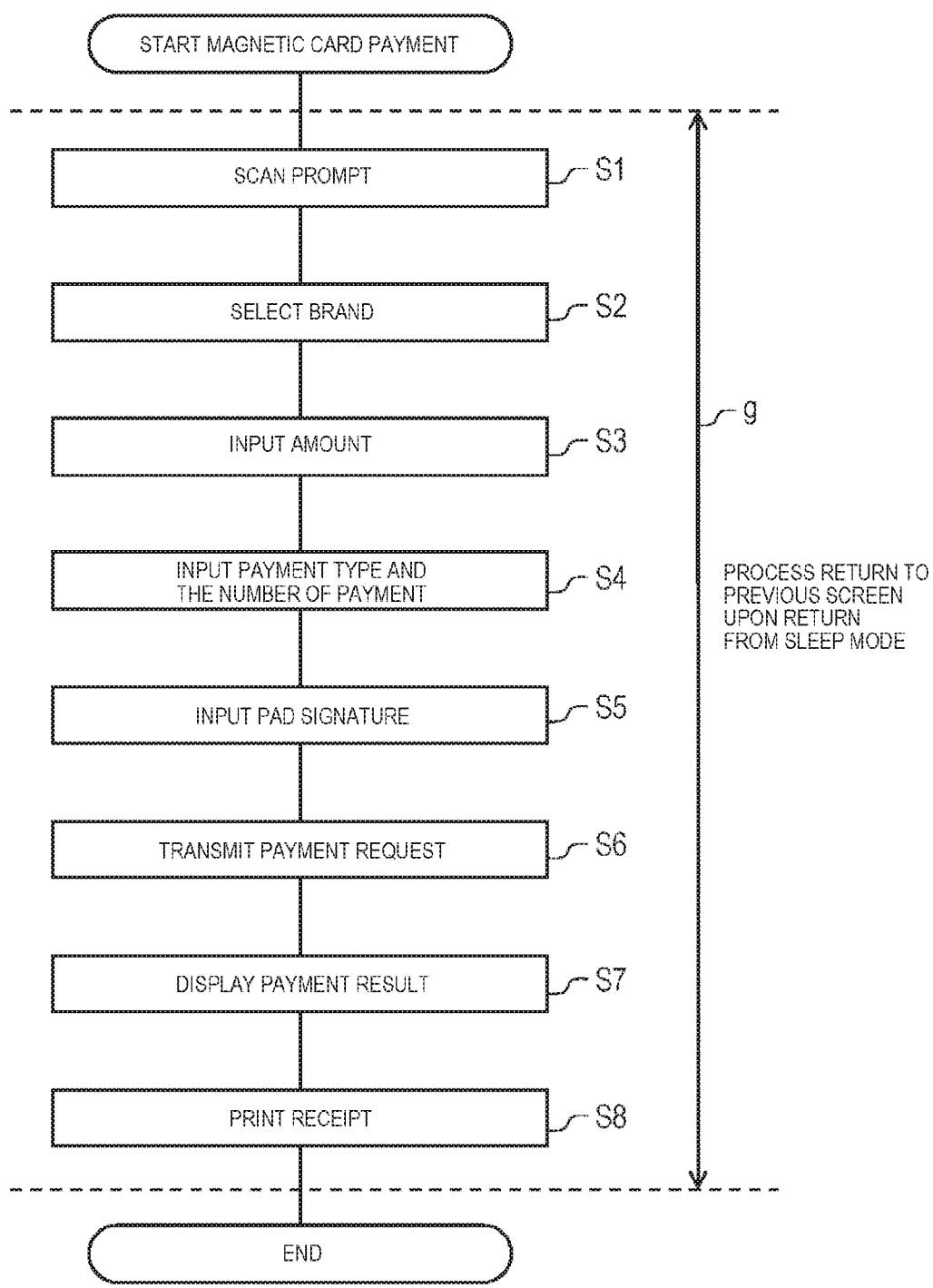
FIG. 11 is a flow chart illustrating a payment processing procedure of the payment terminal device according to the third exemplary embodiment.

FIG. 11 is a flow chart illustrating a payment processing procedure of payment terminal device 1 according to the third exemplary embodiment. Since each process of the flow chart shown in FIG. 11 is identical to each process of the flow chart shown in FIG. 3 in the above-described first exemplary embodiment, the detailed description of each process will not be described.

Figure 12:
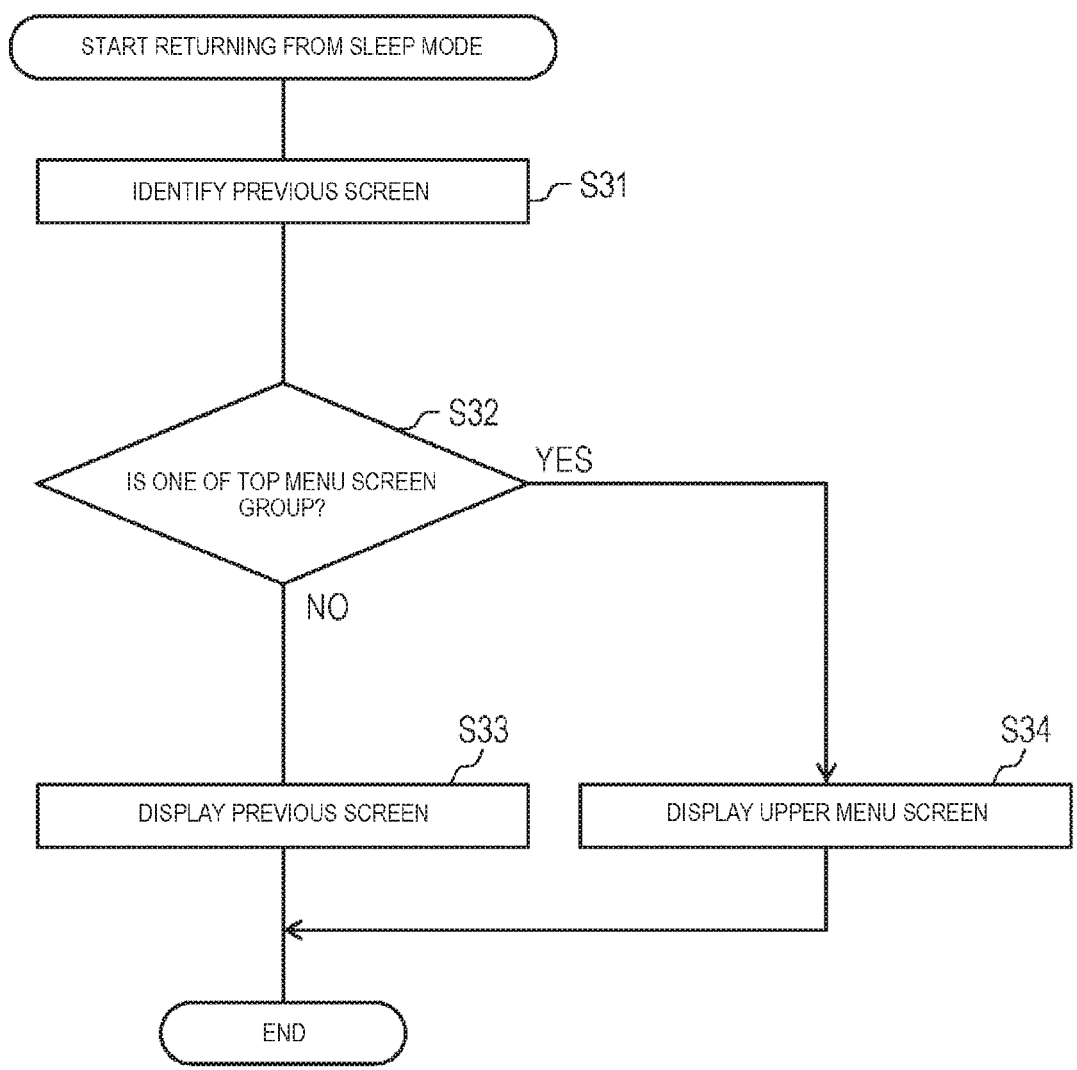
FIG. 12 is a flow chart illustrating a return processing procedure from a sleep mode of the payment terminal device according to the third exemplary embodiment.

In payment terminal device 1 according to the third exemplary embodiment, unlike the above-described second exemplary embodiment, CPU 21 controls display 3B of touch panel 3D to shift to the sleep mode in a time period indicated by an arrow g of FIG. 11 (that is, in a time period from the display process of the scan prompt for prompting a reading of magnetic credit card of Step S1 to the print process as a receipt of the confirmation result of the various input matters of the transaction content of Step S8), in the time period indicated by the arrow g, when the screen is return from the sleep mode, the screen displayed immediately before the shifting to the sleep mode is displayed as a return destination screen, FIG. 12 is a flow chart illustrating a return processing procedure from a sleep mode of payment terminal device 1 according to the third exemplary embodiment. The return process shown in FIG. 12 is executed in a case where an invent of the any input operation (for example, key operation) of the operator with respect to payment terminal device 1 is generated. The event of the input operation is power supply switch 3E press interrupt and a touch detection interrupt to touch input detector 3C. The event may recognize the generation by polling.

In FIG. 12, CPU 21 determines the type (including sort or hierarchy. Similarly below) of the screen (previous screen) displayed on display 3B of touch panel 3D immediately before the shifting to the sleep mode (S31). For example, information of the previous screen can be grasped by CPU 21 by searching the type of screen read at the latest date and time which is maintained in use frequency counter 21B.

CPU 21 identifies that the previous screen is the top menu screen than the partition line b shown in FIG. 10 (that is, the left menu screen) or submenu screen (that is, the right side menu screen) (S32).

In a case where the previous screen is the submenu screen than the partition line b shown in FIG. 10 (S32, NO), CPU 21 continues the display of the previous screen on display 3B of touch panel 3D (S33). For example, all of the menu screens corresponding to the detailed process content relating to the payment processing are the sub screen than the partition line b shown in FIG. 10. Therefore, when the screen is returned from the sleep mode, payment terminal device 1 displays the previous screen without any change.

On the other hand, in a case where the previous screen is the one of the top menu screen group upper than the partition line b shown in FIG. 10(S32, YES), CPU 21 displays the top menu screen then the previous screen as the predetermined screen on display 3B of touch panel 3D (S34). After the process of Steps S33 or S34, the processes of CPU 21 are terminated. In this manner, CPU 21 determines whether switching between the menu screens in display 3B of touch panel 3D after leasing the sleep mode is necessary based on the type of the screen (menu screen) displayed immediately before the shifting to the sleep mode.

Figure 13A:
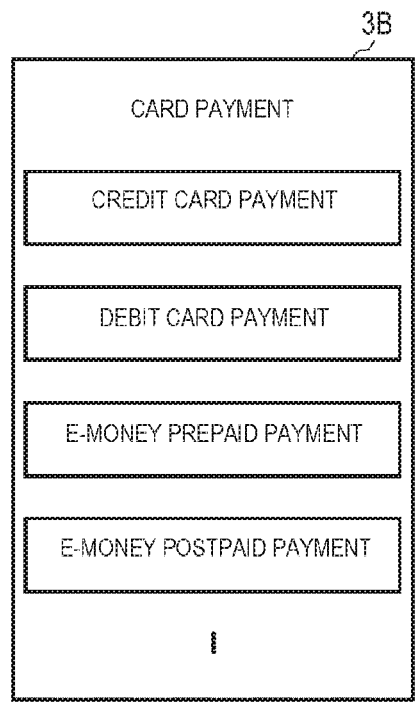
FIG. 13A is a diagram illustrating the menu screen displayed immediately before shifting to a sleep mode.
Figure 13C:
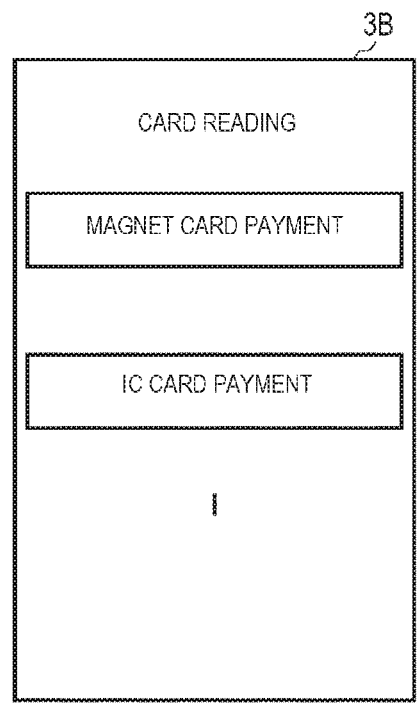
FIG. 13C is a diagram illustrating the menu screen displayed immediately before shifting to the sleep mode.
Figure 13B:
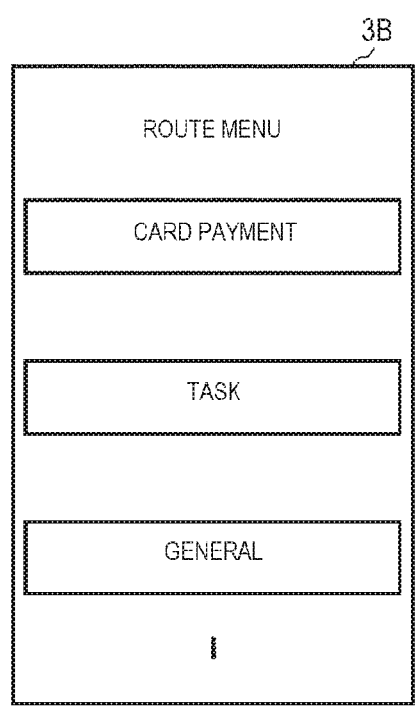
FIG. 13B is a diagram illustrating a top menu screen to be displayed when returning from the sleep mode in the menu screen of FIG. 13A.
Figure 13D:
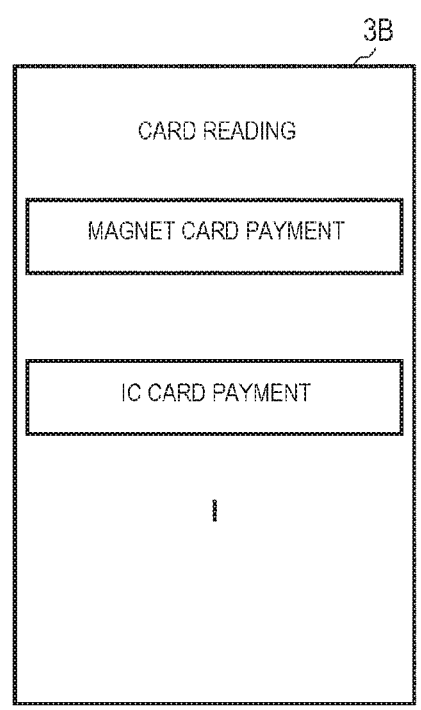
FIG. 13D is a diagram illustrating the menu screen as a previous screen to be display when returning from the sleep mode in the menu screen of FIG. 13C.

FIG. 13A is a diagram illustrating the menu screen displayed immediately before shifting to a sleep mode. FIG. 13B is a diagram illustrating a top menu screen to be displayed when returning from the sleep mode in the menu screen of FIG. 13A. FIG. 13C is a diagram illustrating the menu screen displayed immediately before shifting to the sleep mode. FIG. 13D is a diagram illustrating the menu screen as a previous screen to be display when returning from the sleep mode in the menu screen of FIG. 13C. In the other words, the menu screen shown in FIG. 13C is identical to the menu screen shown in FIG. 13D.

According to the above, in the third exemplary embodiment, when any menu screen relating to the payment processing is displayed on display 3B of touch panel 3D, payment terminal device 1 detects the input operation with respect to the menu screen. In a case where the input operation is not detected over the certain time in the menu screen, payment terminal device 1 controls the display 3B of touch panel 3D to shift to the sleep mode. In addition, if the sleep mode is released when the input operation is detected after shifting to the sleep mode, payment terminal device 1 determines whether switching between the menu screens to be displayed on display 3B of touch panel 3D is necessary, based on the type of the menu screen displayed on display 3B of touch panel 3D immediately before the shifting to the sleep mode.

Accordingly, if focusing on that the type of the menu screen displayed immediately before shifting to the sleep mode is different depending on that the input operation is performed by the operator's judgment or under the operator's intend or not, when the display 3B of touch panel 3D is released from the sleep mode, since payment terminal device 1 switches the menu screen after releasing from the sleep mode according to the type (sort) of the menu screen displayed immediately before shifting of the sleep mode, the display of the menu screen which is unintended by the operator can be suppressed. Therefore, it is possible to improve the convenience of the input operation with respect to the operator.

In addition, in a case where the menu screen displayed on display 3B of touch panel 3D immediately before shifting to the sleep mode is a menu screen allocated the top hierarchy than the predetermined hierarchy to be defined in the predetermined hierarchy relationship, payment terminal device 1 switches the menu screen displayed on the display 3B of the touch panel 3D immediately before shifting to the sleep mode to the predetermined screen and displays the predetermined screen on display 3B of touch panel 3D. Therefore, in a case where the menu screen allocated the top hierarchy than the predetermined hierarchy is displayed immediately before shifting to the sleep mode, for example, when focusing on that the operator is likely to have been selected or explored which process is aimed in specifically, payment terminal device 1 switches the menu screen displayed on display 3B of touch panel 3D after the sleep mode is released to the predetermined the screen. Therefore, a process desired by the operator can be easily selected.

In addition, in a case where the menu screen displayed on the display 3B of the touch panel 3D immediately before shifting to the sleep mode is the menu screen which is allocated in hierarchical lower than the hierarchical corresponding to the predetermined menu screen, payment terminal device 1 continues the display of the menu screen displayed on the display 3B of the touch panel 3D immediately before shifting to the sleep mode. Therefore, in a case where the menu screen which is allocated in hierarchical lower than the hierarchical corresponding to the predetermined menu screen is displayed immediately before shifting to the sleep mode, when the operator is likely to have been executed any process is aimed in specifically, payment terminal device 1 continues the display of the menu screen displayed on display 3B of touch panel 3D after the sleep mode is released to the screen displayed immediately before shifting to the sleep mode out any change. The process desired by the operator can be rapidly executed.

In the present exemplary embodiment, in the left side menu screen than the partition line b shown in FIG. 10, a return destination when returning from the sleep mode is the top screen as a predetermined screen, and may be a return destination to be described. For example, the screen of a top menu in the payment processing (that is, the menu screen of the card payment) may be set to a return destination. Therefore, since the predetermined screen is a screen which is allocated in hierarchy lower than the hierarchy corresponding to the menu screen displayed on the touch panel immediately before sifting to the sleep mode among the plurality of screens relating to the payment processing, payment terminal device 1 can easily select a process or a menu which is desired by the operator as a screen to be displayed on display 3B of touch panel 3D after releasing the sleep mode.

In addition, the specific menu screen specified by an administrator such as the acquirer or the payment processor may be set as a return destination. Therefore, the predetermined screen is the screen allocated in any one of the hierarchy among the predetermined hierarchical relationships which is specified in accordance with the predetermined input operation in advance by the administrator such as the acquirer or the payment processor, since payment terminal device 1 displays a screen allocated in the hierarchy in accordance with the predetermined input operation (for example, the instruction from the acquirer or the payment processor) as a screen displayed on display 3B of touch panel 3D after releasing the sleep mode, a menu is displayed as a starting point when the operator is in doubt or in trouble in the operation. Therefore, it is possible to improve the convenience of the input operation with respect to the operator.

In addition, among the plurality of menu screens maintained by flash ROM 32, a screen, in which the use frequency measured by use frequency counter 21B is equal to or more than the predetermined value, (that is a screen with high frequency of use) may be set as the return destination. Therefore, the predetermined screen, in which the display frequency in display 3B of touch panel 3D as a screen relating to the payment processing is equal to or more than the predetermined value, is a screen allocated the top hierarchy than the predetermined hierarchy. Therefore, payment terminal device 1 displays a process or a menu which is frequently used by the operator as the menu screen to be displayed on display 3B of touch panel 3D after releasing the sleep mode. Therefore, it is possible to provide a sense of security at the time of the operation of the operator and to improve the convenience. In a case of a plurality of the screens with high frequency of use, payment terminal device 1 may set the top screen than the precious screen as the return destination, for example.

(Background to Details of a Fourth Embodiment)

Before being given to a fourth embodiment, explanations are first given to a background to details according to the fourth embodiment of payment terminal device 1.

In the display area of a touch panel type display, an information display area and an information input area are set and the numeric keypad image pattern is displayed on the information input area. Accordingly, the input operation can be performed with respect to the numeric keypad image pattern. A compact type payment terminal further provided with a printer prints information such as the payment processing result on a roll sheet which is housed inside thereof in advance, and discharges the receipt on which the print content is printed from a discharge port. In the compact type payment terminal, power from an external commercial power source (for example, AC 100 V) through an AC adapter which is stored inside a housing.

However, in the compact type payment terminal, during the printer is operated, power of a paper feeder of the compact type payment terminal is consumed or many power is consumed for driving a print head for printing to the printing paper. Therefore, during the printer is operated (that is, printing), many power is consumed inside the compact type payment terminal. Accordingly, a temperature inside the compact type payment terminal rapidly increases. If the temperature inside the compact type payment terminal is increased, there is a possibility that the increases in the temperature causes a malfunction or deterioration in electronic components which are mounted on a circuit inside thereof. Therefore, it is desired to reduce the power consumption of the compact type payment terminal and reduce the total amount of current flowing into the AC adaptor. In addition, in the AC adaptor, it is needed to use significantly volume parts and significantly heavy parts in which high-power and high-current can be supplied. For placing the device to the store that cannot be said that the installation space is widely secured, it is desired to reduce the size of the AC adaptor.

Fourth Exemplary Embodiment

In the fourth exemplary embodiment, during the printer is operated, by temporally suppress or stop a part of function or process, the total amount of current flowing into a power supply stored inside the housing is reduced, and an example of the card payment terminal device for reducing the power consumption.

Since an appearance of payment terminal device 1 according to the fourth exemplary embodiment is identical to the appearance (refer to FIG. 1) of the payment terminal device according to the above mentioned first exemplary embodiment, the same reference numerals are used. Therefore, the description thereof will not be described below.

Figure 14:
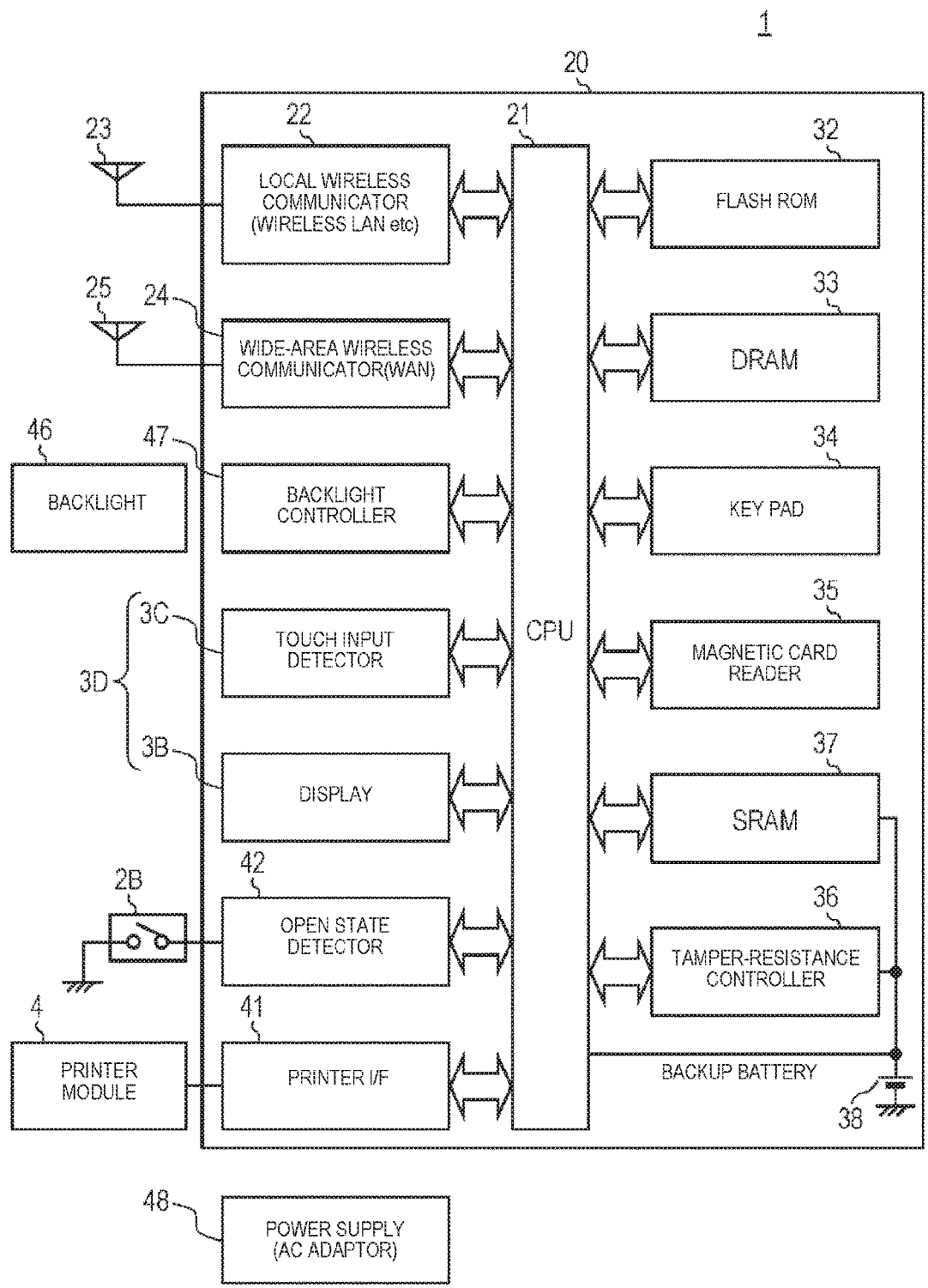
FIG. 14 is a block diagram illustrating an example of a hardware configuration of the payment terminal device according to a fourth exemplary embodiment in detail.

FIG. 14 is a block diagram illustrating an example of a software configuration of payment terminal device 1 according to the fourth exemplary embodiment in detail. In addition, in the hardware configuration of payment terminal device 1, the same components as the corresponding components of payment terminal device 1 of the first exemplary embodiment are denoted by the same reference numerals and will not be described below.

In addition to the configuration of payment terminal device 1 shown in FIG. 1, payment terminal device 1 shown in FIG. 14 further has backlight 46 as an example of the illuminator which turns on and illuminates display 3B displaying the screen relating to the payment processing and backlight controller 47 which performs various of turning on, attenuating (low lighting), and turning off backlight 46. Backlight controller 47 is connected to CPU 21.

Backlight controller 47 performs various controls of turning on, attenuating, and turning off backlight 46 according to an instruction from CPU 21. For example, by turning off or gradually attenuating backlight 46, turning off or attenuating of backlight 46 is performed. Backlight controller 47 may have a light adjusting function which can continuously change the light emitting amount of backlight 46.

In addition, payment terminal device 1 shown in FIG. 14 has power supply 48 for supplying power as a power source with respect to each part included in information processor 20. Power supply 48 is stored in a housing of payment terminal device 1. For example, it can be implemented using a relatively small capacity AC adapter.

The procedures of the payment processing in payment terminal device 1 according to the first exemplary embodiment are identical to the operation procedures (refer to FIG. 3) in payment terminal device 1 according to the above-described first exemplary embodiment, the description will not be described and the different operation will be described below.

Figure 15:
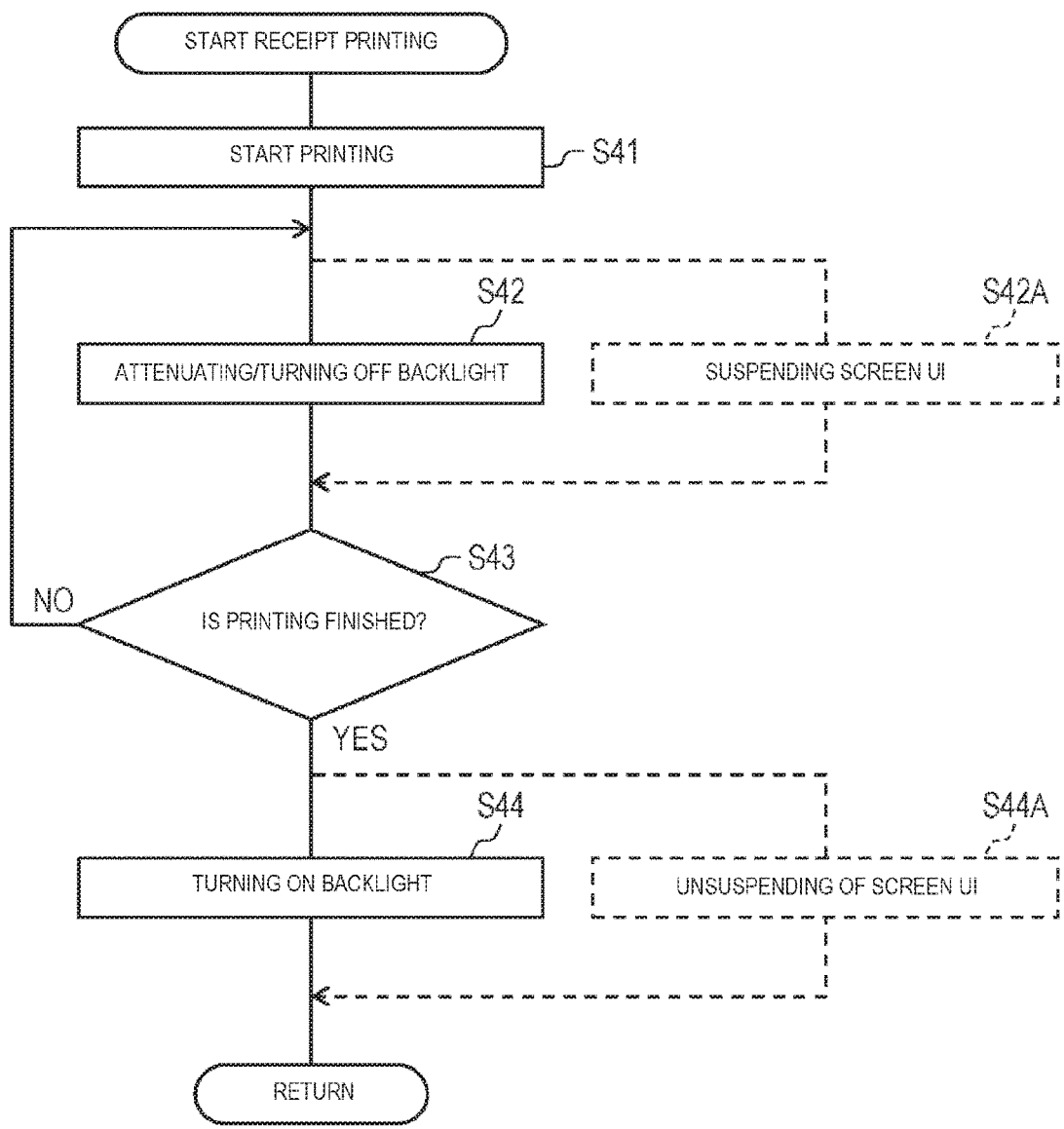
FIG. 15 is a flow chart illustrating an operation procedure of receipt printing of Step S8 shown in FIG. 3 of the payment terminal device according to the fourth exemplary embodiment.

FIG. 15 is a flow chart illustrating an operation procedure of receipt printing of Step S8 shown in FIG. 3 of payment terminal device 1 according to the fourth exemplary embodiment.

In FIG. 15, CPU 21 start a process printing the confirmation result of the transaction content that is a target of the payment processing as a receipt (S41). For example, at the same time when printing is started in Step S41, CPU 21 gives an instruction to backlight controller 47 to turn off or attenuate backlight 46 (S42). From the view point of reducing the power consumption, it is preferable that CPU 21 turns off backlight 46. An operation for turning off or attenuating backlight 46 is performed after starting a print process in Step S41 and before starting the print operation substantially, or after staring a print operation. From the view point of reducing the power consumption, it is preferable that the backlight is turned off of attenuated before starting operations of a print head and a motor of printer module 4 or a printing operation such as a print data transmission process from printer I/F 41 to printer module 4.

CPU 21 determines whether printing is finished (S43). In a case where the printing is not finished (S43, NO), the process of CPU 21 returns to Step S42.

On the other hand, in a case where the printing is finished (S43, YES), CPU 21 give an instruction to backlight controller 47 to turn on turned off or attenuated backlight 46 (S44). Thereafter, a process of CPU 21 returns to a time point of a process of Step S8 shown in FIG. 3. That is, the operation of payment terminal device 1 is terminated.

At the same time when printing is started in Step S41, CPU 21 performs the turning off and attenuating control of backlight 46 in Step S42 and may perform a process for interrupting touch panel 3D (that is, a detection process of the input operation of a screen user interface (UI) and a display process of a screen or the like such as a graphic process and a driving a liquid crystal display plate driver) at the same time (S42A). In the other words, in the interrupt process of the screen UI (that is, the interrupt process of touch panel 3D), CPU 21 stops a detection of the touch input operation by touch input detector 3C. In addition, the display of the screen (for example, the screen relating to the payment processing) by display 3B is interrupted. When a display process of a screen such as the turning off or attenuating (low lighting) backlight 46 or the graphic process or driving the liquid crystal display plate drive is interrupted, CPU 21 is in a non-visible state of display contents of the screen (display) of the screen UI or in a state where it is difficult to recognize the display contents. When the process in a state of the non-visible of the display contents or in a state where it is difficult to recognize the display content is performed during the print portion, the power to be used for turning on backlight 46, graphic processing or driving of the liquid crystal display plate can be reduced. Accordingly, the power consumption of overall payment terminal device during the printing operation required of a large power consumption in particular is reduced. Accordingly, the total amount of the current flowing into the AC adapter also reduced, and the size thereof is reduced. Therefore, the payment terminal device can be displaced to a store that cannot be said that the installation space is widely secured. Thereafter, the process of CPU 21 proceeds to Step S43.

In addition, when the printing in Step S43 is finished, CPU 21 turns on backlight 46 in Step S44 and performs a process for releasing the interrupt of the screen UI (touch panel 3D) (S44A). That is, CPU 21 releases a state of the non-visible of the display contents of the screen (display) of the screen UI or the state where it is difficult to recognize the display contents. Thereafter, a process of CPU 21 returns to a time point of a process of Step S8 shown in FIG. 3. That is, the operation of payment terminal device 1 is terminated.

According to the above, during the information relating to the payment processing is printed in printer module 4, payment terminal device 1 according to the fourth exemplary embodiment, for example, attenuates or turns off backlight 46 illuminating display 3B of touch panel 3D displaying the screen relation to the payment processing.

Therefore, during printer module 4 is operated, since payment terminal device 1 temporarily attenuates (reduce) or turns off (stop) backlight 46 for suppressing the illuminator with respect to display 3B of touch panel 3D as a part of the function or the process, preferentially, the total amount of the current flowing into power supply 48 (for example, AC adapter) stored inside the housing of payment terminal device 1 can be reduced. Furthermore, the power consumption in payment terminal device 1 can be reduced.

In addition, since payment terminal device 1 turns on backlight 46 by increasing the brightness than during printing, after the printing of the information relating to the payment processing is finished by printer module 4, if turning on backlight 46 so as to increase the brightness at the time of turning on backlight 46 as compared of printing increasing at least power consumption at a time period excluding printing including the power consumption, the increase in the total amount of current flowing into power supply 48 stored inside the housing of payment terminal device 1 can be suppressed.

In addition, since payment terminal device 1 temporally stops the function of touch panel 3D including touch input detector 3C for detecting the input operation with respect to the screen relating to the payment processing in addition to priority turning off or attenuating backlight 46, during the information relating to the payment processing is printed by printer module 4, the increase in the total amount of current flowing into power supply 48 stored inside the housing of payment terminal device 1 can further be suppressed.

In addition, since payment terminal device 1 release the interrupt of the detection of the input operation in touch input detector 3C of touch panel 3D, after the printing of the information relating to the payment processing is finished by printer module 4, the increase in the total amount of current flowing into power supply 48 stored inside the housing of payment terminal device 1 can be suppressed, even when the detection process of the input operation is continued in addition to the turning on backlight 46 at a time period excluding printing increasing the power consumption.

In addition, since payment terminal device 1 temporally stops and reduces the process of supplying power to display 3B of touch panel 3D in addition to the turning off or attenuating backlight 46, during the information relating to the payment processing is printed by printer module 4, the increase in the total amount of current flowing into power supply 48 stored inside the housing of payment terminal device 1 can further be suppressed.

In addition, since payment terminal device 1 releases the interrupt or the reduction of the supplying power to display 3B of touch panel 3D, after the printing of the information relating to the payment processing is finished by printer module 4, the increase in the total amount of current flowing into power supply 48 stored inside the housing of payment terminal device 1 can be suppressed, even when the supplying power to display 3B of touch panel 3D is continued in addition to the turning on backlight 46 at a time period excluding printing increasing the power consumption.

In addition, payment terminal device 1 controls the display content of display 3B of touch panel 3D to in the non-visible state, during the information relating to the payment processing is printed by printer module 4, the power used for turning on backlight 46, the graphic processing, or the driving of the liquid crystal display plate driver can be reduced. Accordingly, the power consumption of overall payment terminal device during the printing operation required of a large power consumption in particular is reduced. Accordingly, the total amount of the current flowing into the AC adapter also reduced, and the size thereof is reduced. Therefore, the payment terminal device can be displaced to a store that cannot be said that the installation space is widely secured.

In addition, payment terminal device 1 releases the non-visible state of the display content of display 3B of touch panel 3D, during the information relating to the payment processing is printed by printer module 4, after the printing of the information relating to the payment processing is finished by printer module 4, the increase in the total amount of current flowing into the AC adapter stored inside the housing of payment terminal device 1 can be suppressed, even when the supplying power (for example, the display process (for example, the graphic process) or the supplying the power used for the driving of display 3B (for example, the driving of the liquid crystal display plate driver)) to display 3B of touch panel 3D is continued at a time period excluding printing increasing the power consumption.

(Background to Details of a Fifth Embodiment)

Before being given to a fifth embodiment, explanations are first given to a background to details according to the fifth embodiment of payment terminal device 1.

In the following description, for descriptive purposes, the card payment terminal device having a function for generating data of the screen (screen data) relating to the payment processing to be displayed on a display such as a touch panel and displaying the generated data on the display is defined as a "rich client type" payment terminal device. On the other hand, for descriptive purposes, the payment terminal device without the function for generating the screen data (for example, the payment terminal device according to each exemplary embodiment including the fifth exemplary embodiment) is defined as a "thin client type" payment terminal device.

For example, in the rich client type payment terminal device, a remote host system having a role as a server and a terminal having a role as a client are connected. The terminal has a hypertext transfer protocol (HTTP) client function as a communication method with the remote host system. The terminal executes the payment program read by a hypertext markup language (HTML).

However, in order to minimize the function and the processing load of the payment terminal device, in a case where it is assumed to shift to the use of the thin client type payment terminal device from the rich client type payment terminal device, since the thin client type payment terminal device do not have a function of generating the above-described screen data, the screen data is generated on the server device (for example, a payment center device operated by the acquirer or third-party payment processor) and the generated screen data is further transferred to and displayed on the payment terminal device.

Therefore, payment processing apparatus installed in a store, when the screen data relating to the input operation to the payment terminal device from being some kind of input operation takes reception time network conditions, the screen is displayed for the input operation time increases until, when the delay data transfer from the server device is caused, it is difficult to complete without delay payment processing, it becomes also possible to wait for the customer.

Fifth Exemplary Embodiment

In the flowing fifth exemplary embodiment, a plurality of processes included in the payment processing are collected and executed, an example of the card payment terminal device for achieving the reduction in a time required for the payment processing will be described.

Since an appearance of payment terminal device 1 according to the fifth exemplary embodiment is identical to the appearance (refer to FIG. 1) of the payment terminal device according to the above mentioned first exemplary embodiment, the same reference numerals are used. Therefore, the description thereof will not be described below. Since the software configuration of payment terminal device 1 according to the fifth exemplary embodiment is identical to the configuration of the payment terminal device according to the above-described first exemplary embodiment (refer to FIG. 2), the same reference numerals are used. Therefore, the description thereof will not be described below.

Figure 16:
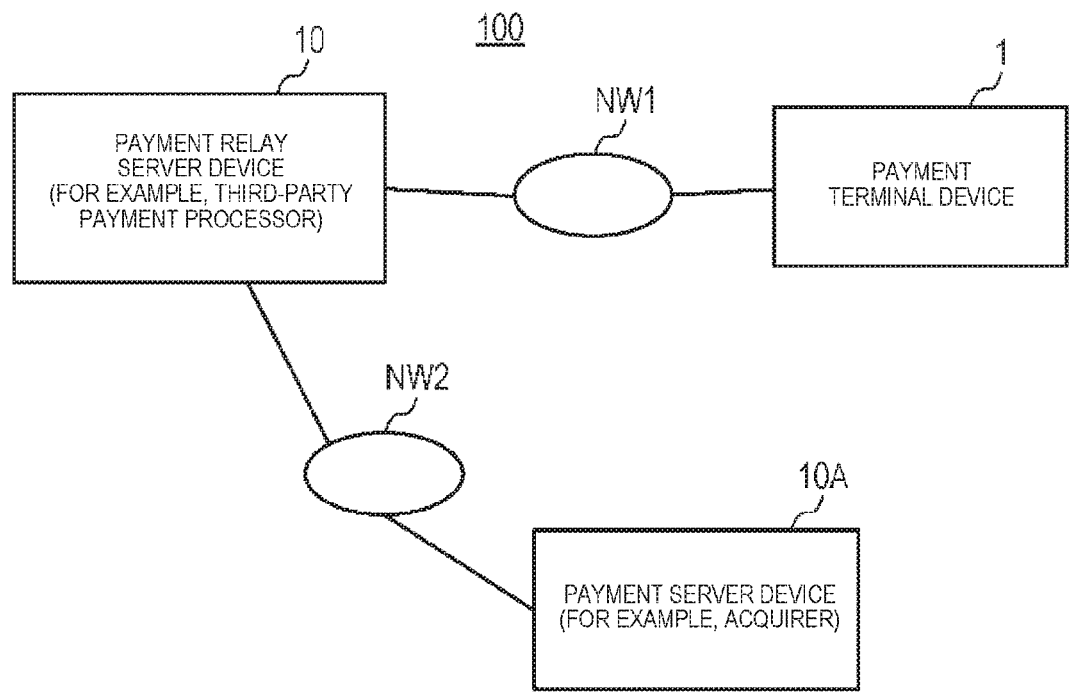
FIG. 16 is a diagram simply illustrating a system configuration of a payment processing system including a payment terminal device according to a fifth exemplary embodiment.

FIG. 16 is a diagram simply illustrating a system configuration of payment processing system 100 including payment terminal device 1 according to the fifth exemplary embodiment. Payment processing system 100 shown in FIG. 16 has a configuration including payment terminal device 1 and payment relay server device 10. In addition, payment processing system 100 may have a configuration further including payment server device 10A. Payment terminal device 1 and payment relay server device 10 are connected to each other through network NW1. Payment relay server device 10 and payment server device 10A are connected to each other through network NW2. Payment terminal device 1 and payment server device 10A are connected to each other through network NW1. For simplification of description, one payment terminal device 1 is illustrated in FIG. 16. However, a plurality of payment terminal device 1 may be connected.

Networks NW1 and NW2 are the Internet or intranet in which a wireless network or a wired network is connected as an interface. The wireless network, for example, is a wireless local area network (LAN), a wireless wide area network (WAN), a 3G, a long term evolution (LTE), or a wireless gigabit (WiGig). The wired network, for example, is IEEE802.3 or ETHERNET (registered trademark).

When the payment processing (for example credit inquiry or sales process) is required from the payment terminal device 1, payment relay server device 10 performs relaying such as such integrating the payment processing with respect to the payment sever device (for example, payment server device 10A which is operated by the specific acquirer). In addition, the information (for example, the credit result or the input content form payment terminal device 1) related to the payment processing from payment server device 10A is expanded, or the information is modified, edited and generated according to the attribution or setting of settlement terminal device 1, and relayed to payment terminal device 1.

In addition, payment relay server device 10 generates the execution program collectively including the screen or the data to be used in a plurality of processes (for detail, refer to below) relating to the payment processing, generates the screen data including the execution program, and transmits the screen data to payment terminal device 1. Hereinafter, a plurality of processes relating to the payment processing is described as payment processing A.

When payment server device 10A receives a request of the payment processing from payment terminal device 1 (for example, a credit inquiry or a sales registration), payment server device 10A performs various payment processes in accordance with the request of the payment processing relayed from payment relay server device 10. Accordingly, the payment server device 10A alerts the process result to payment relay server device 10.

Figure 17:
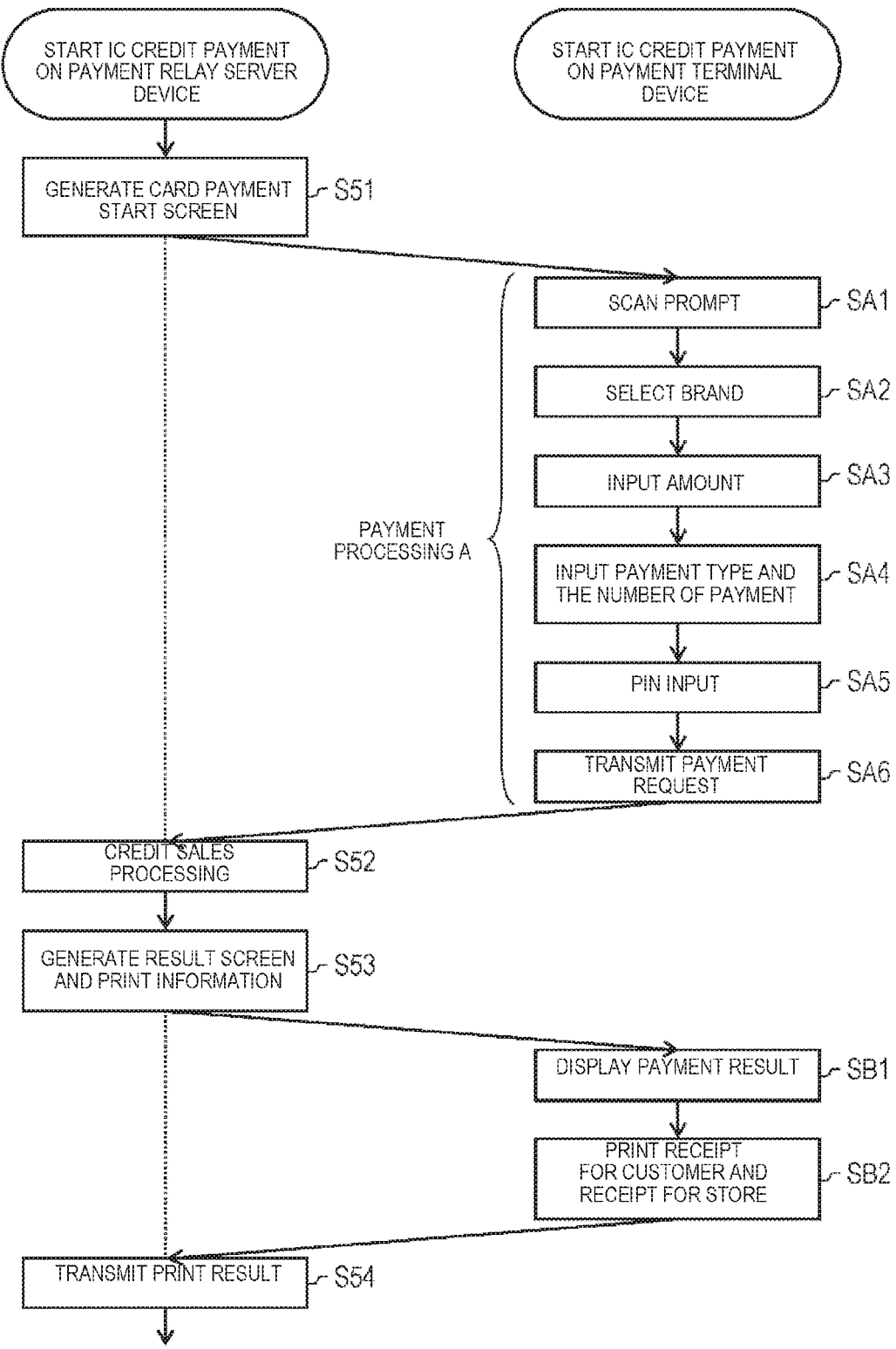
FIG. 17 is a sequence diagram illustrating an example of an operation procedure of the payment processing using an IC credit card between the payment terminal device and a payment relay server device according to the fifth exemplary embodiment.

FIG. 17 is a sequence diagram illustrating an example of an operation procedure of the payment processing using an IC credit card between payment terminal device 1 and payment relay server device 10 according to the fifth exemplary embodiment. FIG. 18 is an explanatory diagram illustrating an example of HTML data defining an execution program of payment processing A included in a card payment start screen. In the description of FIG. 17, since the description relating to each process is identical to the description with referred to FIG. 3 in the above-described first exemplary embodiment, the content different from the FIG. 3 will be described.

In FIG. 17, payment relay server device 10 generates a start screen of the card payment using a card (for example, an IC credit card). That is, payment relay server device 10 generates data of a card payment terminal device start screen including an execution program as HTML data shown in FIG. 18 (S51). That is, payment relay server device 10 generates the screen data displayed on payment terminal device 1 during a execution of payment processing A, generates the execution program including these screen data items, generates data of the card payment start screen including the execution program, and transmits the data to payment terminal device 1.

In the execution program shown in FIG. 18, a part of header HD or body BD is shown, and when a function of "PaymentInfInput ( )" of body BD indicated by a reference numeral PRA is called, as a function of "PaymentInfInput ( )" described on header HD indicated by a reference numeral PRS, each of processes the "scan prompt (refer to Step SA1)", the "brand selection (refer to Step SA2)", the "amount input (refer to Step SA3)", the "payment type and the number of payments input (refer to Step SA4)", the "PIN input (refer to Step SA5)", and the "payment request transmission (refer to Step SA6)" are continuously executed in the payment terminal device 1. In other words, a total of six processes in Steps SA1 to Step SA 6 (payment processing A) are continuously performed in thin client type payment terminal device 1.

FIGS. 19A to 19F are diagrams illustrating an example of each screen to be displayed on a touch panel of the payment terminal device for each processing during executing of the execution program of payment processing A. In the process of the scan prompt of Step SA1, CPU 21 of payment terminal device 1 displays screen WD1 shown in FIG. 19A on touch panel 3D. In the process of the brand selection of Step SA2, CPU 21 of payment terminal device 1 displays screen WD2 shown in FIG. 19B on touch panel 3D. In the process of the amount input of Step SA3, CPU 21 of payment terminal device 1 displays screen WD3 shown in FIG. 19C on touch panel 3D. In the process of the payment type and the number of payments of Step SA4, CPU 21 of payment terminal device 1 displays screen WD4 shown in FIG. 19D on touch panel 3D. In the process of the PIN input of Step SA5, CPU 21 of payment terminal device 1 displays screen WD5 shown in FIG. 19E on touch panel 3D. In the process of the payment request transmission of Step SA6, CPU 21 of payment terminal device 1 displays screen WD6 shown in FIG. 19F on touch panel 3D.

After Step SA 6, payment relay server device 10, in response to the transmitted payment request from payment terminal device 1 in Step SA 6, a credit inquiry or a credit determination is performed, sales processing is performed in a case where the determination result where it the may be credit was obtained (credit sales processing, S52), then the screen data and the print information relating to the results of the credit sales processing is transmitted to payment terminal device 1 (S53).

Figure 19G:
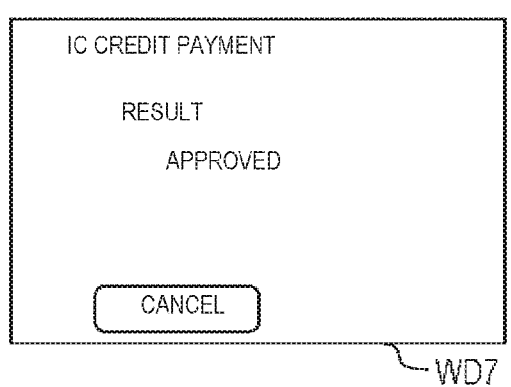
FIG. 19G is a diagram illustrating an example of a screen relating to a payment processing result.
Figure 19H:
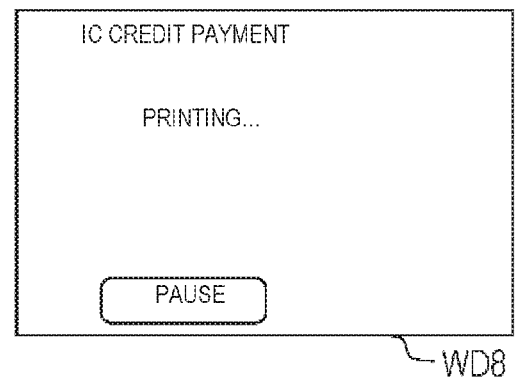
FIG. 19H is a diagram illustrating an example of a screen indicating during print processing of a receipt for a customer or a store.

Payment terminal device 1 displays on touch panel 3D the result screen relating to the payment processing using the screen data transmitted from payment relay server device 10 in Step S53 (SB1), and further performs a printing processing of the receipt for the customer and the receipt for the store relating to the payment processing on the printing paper (SB2). FIG. 19G is a diagram illustrating an example of a screen relating to a payment processing result. FIG. 19H is a diagram illustrating an example of a screen indicating during print processing of a receipt for a customer or a store.

Figure 20A:
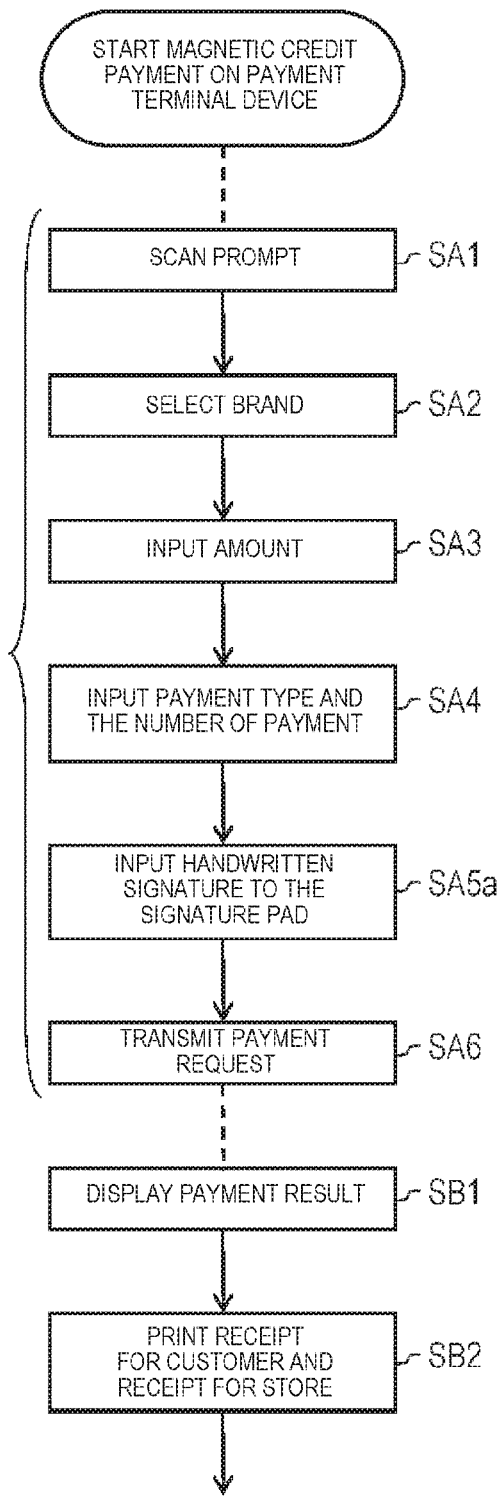
FIG. 20A is a flow chart illustrating a first example of the operation procedure of the payment processing using a magnetic credit card in the payment terminal device according to the fifth exemplary embodiment.
Figure 20B:
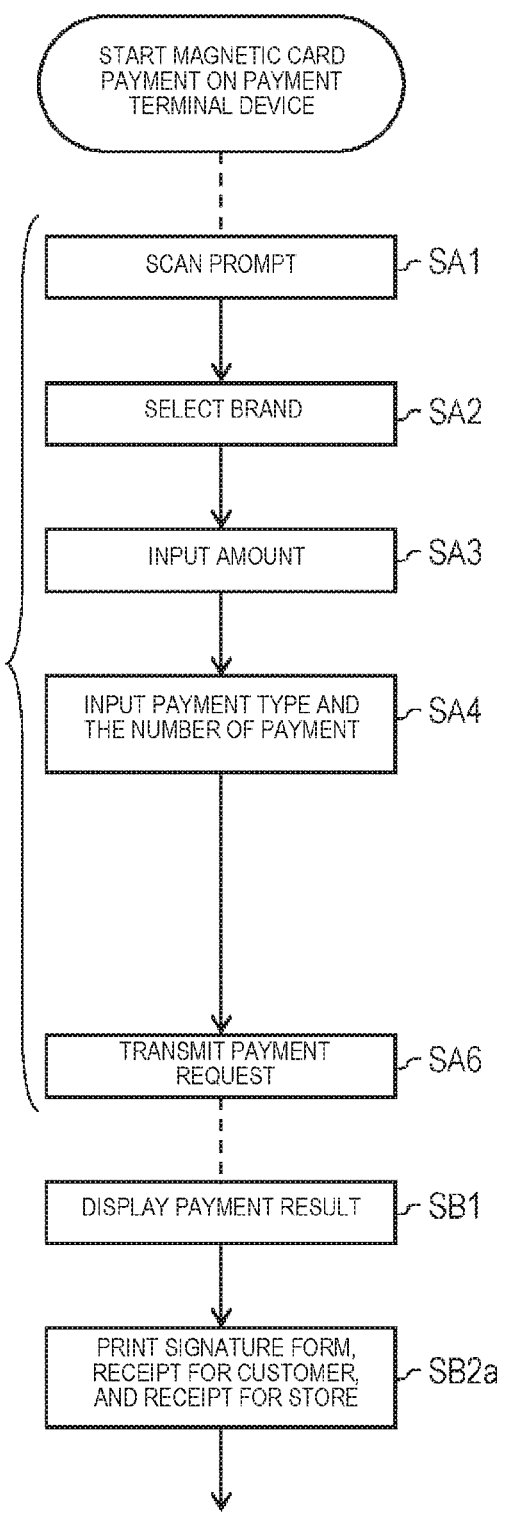
FIG. 20B is a flow chart illustrating a second example of the operation procedure of the payment processing using a magnetic credit card in the payment terminal device according to the fifth exemplary embodiment.

In the present exemplary embodiment, the description relating to the payment processing using the IC credit card in FIG. 17 is described, and it can be similarly applied even when the payment processing using the magnetic credit card. FIG. 20A is a flow chart illustrating a first example of the operation procedure of the payment processing using a magnetic credit card in the payment terminal device according to the fifth exemplary embodiment. FIG. 20B is a flow chart illustrating a second example of the operation procedure of the payment processing using a magnetic credit card in the payment terminal device according to the fifth exemplary embodiment.

In the description of FIG. 20A or FIG. 20B, in the content identical to the description of FIG. 17, the same reference numerals are given, and the description will not be describe. The content different from the description of FIG. 17 will be described. In the payment of the magnetic credit card, the PIN is rarely entered, and identification by the signature of the customer who is the holder of the magnetic credit card is often performed. Therefore, in FIG. 20A, in Step SA5*a*, the signature of the customer is entered to the signature PAD (for example, an input device that is used when the customer sings its signature electronically at a predetermined region on the touch panel with a finger or a stylus pen).

On the other hand, in FIG. 20B, there is another operation example in the FIG. 20A, the processing of Step SA5*a* shown in FIG. 20A is omitted, and in Step SB2*a*, a sign form signed by handwriting with a pen of the customer who is a holder of a magnetic credit card is further printing. That is, the results for the payment processing customer when entered in the signature signed form as evidence that it is determined that no problem, so that the payment of the magnetic card is completed.

According to the above, since the execution program collectively including the screen or data to be used in a plurality of processes relating to the payment processing is generated in payment relay server device 10, by transmitting and executing of the execution program from payment relay server device 10, payment terminal device 1 according to the present exemplary embodiment can collectively execute a plurality of processes (including the screen display) included in the payment processing without generating the screen data in the payment processing. Therefore, a reduction in the time required for the payment processing can be obtained and it is possible to relatively reduce the probability to wait a long time the customer.

Although the embodiment has been described by reference to the drawings, it goes without saying that the disclosure is not limited to the disclosure. It is manifest to those who are skilled in the art that various alterations or modifications be conceivable within the scope of the claims, and the alterations or modifications should be construed as naturally falling within a technical scope of the disclosure.

INDUSTRIAL APPLICABILITY

The present disclosure is effective as the card payment terminal device suppressing an induction of the wrong operation by making the operator easily and clearly aware of the execution of the input operation that is an important factor in the transaction by through the predetermined input operation with respect to the touch panel.

In addition, in a case where a screen relating to at least payment processing is displayed, the present disclosure is effective as the card payment terminal device for rapidly terminating the payment processing of the transaction content by avoiding the shifting to the sleep mode, even in a case that a state where there is no input operation from the operator is continuous over a predetermined time.

In addition, the present disclosure is effective as the card payment terminal device for improving the convenience of the input operation with respect to the operator by suppressing the screen display which is unintended by the operator, when unsuspending the sleep mode of the touch panel.

In addition, the present disclosure is effective as the card payment terminal device for reducing the total amount of the current flowing into the power supply stored inside the housing and reducing the power consumption by pausing or suspending a part of the function or the process during the printer is operated.

REFERENCE MARKS IN THE DRAWINGS

1 payment terminal device
2 main body 2A opening
2B open state detecting switch
2H main body side surface
3 lid
3A top surface
3B display
3C touch input detector
3D touch panel
3E power supply switch
3F return key
4 printer module
5A lock release button
10 payment relay server device
10A payment server device
20 information processor
21 CPU
21A timer
21B use frequency counter
22 local wireless communicator
23 local wireless communication antenna
24 wide-area wireless communicator
25 wide-area wireless communication antenna
32 flash ROM
33 DRAM
34 key pad
35 magnetic card reader
36 tamper-resistance controller
37 SRAM
38 backup battery
41 printer I/F
42 open state detector
46 backlight
47 backlight controller
48 power supply
51a, 51b, 51c, 51d input area
53 numeric keypad
61 important key input receiving icon
63 YES icon
65 NO icon

The invention claimed is:

1. A card payment terminal device comprising:
a payment processor that performs card payment processing;
a printer that prints information relating to the card payment processing;
a display that displays a screen relating to the card payment processing;
an illuminator that illuminates the display; and
a controller which is configured to attenuate or turn off the illuminator during printing of information relating to the card payment processing by the printer, in the card payment processing.

2. The card payment terminal device of claim 1,
wherein the controller is configured not to attenuate or turn off the illuminator during reading of at least card information in the card payment processing.

3. The card payment terminal device of claim 2,
wherein, the controller is configured to turn on a light by increasing brightness than during printing, after the printing of information relating to the payment processing is finished by the printer.

4. The card payment terminal device of claim 2, further comprising:
an input operation detector that detects an input operation with respect to a screen relating to the payment processing,
wherein the controller is configured to suspend detection of the input operation in the input operation detector, when the information relating to the payment processing is printed by the printer.

5. The card payment terminal device of claim 2,
wherein the controller is configured to stop or reduce power supply to the display when the information relating to the payment processing is printed by the printer.

6. The card payment terminal device of claim 2,
wherein the controller is configured to set a display content of the display in a non-visible state when the information relating to the payment processing is printed by the printer.

7. The card payment terminal device of claim 1,
wherein, the controller is configured to turn on a light by increasing brightness than during printing, after the printing of information relating to the payment processing is finished by the printer.

8. The card payment terminal device of claim 1, further comprising:
an input operation detector that detects an input operation with respect to a screen relating to the payment processing,
wherein the controller is configured to suspend detection of the input operation in the input operation detector, when the information relating to the payment processing is printed by the printer.

9. The card payment terminal device of claim 8,
wherein the controller is configured to unsuspend the stop of the input operation detection in the input operation detector, after the printing of the information relating to the payment processing is finished by the printer.

10. The card payment terminal device of claim 1,
wherein the controller is configured to stop or reduce power supply to the display when the information relating to the payment processing is printed by the printer.

11. The card payment terminal device of claim 10,
wherein the controller is configured to release the stop or reduction of the power supply to the display, after the printing of information relating to the payment processing is finished by the printer.

12. The card payment terminal device of claim 1,
wherein the controller is configured to set a display content of the display in a non-visible state when the information relating to the payment processing is printed by the printer.

13. The card payment terminal device of claim 12,
wherein the controller is configured to release the non-visible state of the display content of the display, after the printing of information relating to the payment processing is finished by the printer.

* * * * *